United States Patent
Blankenship et al.

(10) Patent No.: US 9,893,858 B2
(45) Date of Patent: *Feb. 13, 2018

(54) UPLINK SOUNDING REFERENCE SIGNALS FOR MACHINE TYPE COMMUNICATIONS (MTC) USER EQUIPMENT (UE)

(71) Applicant: Telefonaktiebolaget LM Ericsson (publ), Stockholm (SE)

(72) Inventors: Yufei Blankenship, Kildeer, IL (US); Shiwei Gao, Nepean (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/226,494

(22) Filed: Aug. 2, 2016

(65) Prior Publication Data
US 2016/0344527 A1    Nov. 24, 2016

Related U.S. Application Data

(63) Continuation of application No. 14/489,245, filed on Sep. 17, 2014, now Pat. No. 9,420,584.

(51) Int. Cl.
*H04W 4/00* (2009.01)
*H04L 5/00* (2006.01)
(Continued)

(52) U.S. Cl.
CPC .......... *H04L 5/0051* (2013.01); *H04B 1/713* (2013.01); *H04L 5/0053* (2013.01); *H04W 4/005* (2013.01);
(Continued)

(58) Field of Classification Search
CPC ... H04L 5/0051; H04L 5/0053; H04L 5/0012; H04W 72/048; H04W 72/0446; H04W 72/0413; H04W 4/005; H04B 1/713
See application file for complete search history.

(56) References Cited

U.S. PATENT DOCUMENTS 9,420,584 B2 * 8/2016 Blankenship ......... H04L 5/0051
2010/0309852 A1   12/2010 Li
(Continued)

FOREIGN PATENT DOCUMENTS

WO    2013/137699 A1    9/2013

OTHER PUBLICATIONS

PCT Notification of Transmittal of the International Search Report and the Written Opinion of the International Searching Authority, or the Declaration for the International Application No. PCT/IB2015/056948.
(Continued)

*Primary Examiner* — Robert Wilson
(74) *Attorney, Agent, or Firm* — Baker Botts LLP

(57) ABSTRACT

According to some embodiments, a method of operating a wireless device in a wireless system comprises allocating a first uplink sub-channel to the wireless device in a first subframe associated with the wireless device. The first uplink sub-channel comprises a portion of an uplink system bandwidth, and portions of the uplink system bandwidth outside of the first uplink sub-channel are not available for transmission in the first subframe by the wireless device. The method further comprises determining a first sounding reference signal (SRS) sub-channel. The first SRS sub-channel comprises a portion of the first uplink sub-channel in frequency domain, and the SRS sub-channel is available for transmitting SRS in the first subframe by the wireless device.

22 Claims, 14 Drawing Sheets

(51) Int. Cl.
*H04W 72/04* (2009.01)
*H04B 1/713* (2011.01)

(52) U.S. Cl.
CPC ..... *H04W 72/048* (2013.01); *H04W 72/0413* (2013.01); *H04W 72/0446* (2013.01); *H04L 5/0012* (2013.01)

(56) References Cited

U.S. PATENT DOCUMENTS

| | | |
|---|---|---|
| 2012/0252474 A1 | 10/2012 | Tirola |
| 2014/0003288 A1 | 1/2014 | Pan |
| 2014/0016576 A1 | 1/2014 | Noh |
| 2014/0105191 A1 | 4/2014 | Yang |
| 2014/0198726 A1 | 7/2014 | Xu |
| 2014/0313908 A1 | 10/2014 | da Silva |
| 2014/0328230 A1 | 11/2014 | Park |
| 2015/0036666 A1 | 5/2015 | Blankenship |
| 2015/0188685 A1 | 7/2015 | Yamazaki |
| 2015/0327196 A1* | 11/2015 | Blankenship ..... H04W 56/0045 370/281 |
| 2015/0341865 A1 | 11/2015 | Yang |
| 2016/0081084 A1* | 3/2016 | Blankenship ......... H04L 5/0051 370/329 |
| 2016/0255593 A1* | 9/2016 | Blankenship ....... H04W 52/146 370/328 |
| 2016/0344527 A1* | 11/2016 | Blankenship ......... H04L 5/0051 |

OTHER PUBLICATIONS

3GPP TS 36 211 V12.0.0 3rd Generation Partnership Project; Technical Specification Group Radio Access Network; Evolved Universal Terrestrial Radio Access (E-UTRA); Physical channels and modulation (Release 12), Technical Specification, 120 pages. Dec. 2013.

3GPP TS 36 213 V12.0.0, 3rd Generation Partnership Project; Technical Specification Group Radio Access Network; Evolved Universal Terrestrial Radio Access (E-UTRA); Physical layer procedures (Release 12), Technical Specification, 186 pages. Dec. 2013.

3GPP TR 36.888 V12.0.0, Study on provision of low-cost Machine-Type Communications (MTC) User Equipments (UEs) based on LTE (Release 12), Technical Report, 55 pages. Jun. 2013.

\* cited by examiner

_US 9,893,858 B2_

UPLINK SOUNDING REFERENCE SIGNALS FOR MACHINE TYPE COMMUNICATIONS (MTC) USER EQUIPMENT (UE)

PRIORITY

This application is a continuation of U.S. application Ser. No. 14/489,245, filed on Sep. 17, 2014, entitled "Uplink Sounding Reference Signals For Machine Type Communications (MTC) User Equipment (UE)" which is hereby incorporated by reference in its entirety.

TECHNICAL FIELD

Particular embodiments relate generally to wireless communications and more particularly to uplink sounding reference signals for machine type communications (MTC) user equipment (UE).

BACKGROUND

Machine-Type Communication (MTC) is a form of data communication which involves one or more entities that do not necessarily need human interaction. MTC is an important and growing revenue stream for wireless network operators. MTC devices, such as monitors, sensors, controls, etc., may also be referred to as MTC user equipment (MTC UE). Operators benefit from serving MTC devices with already deployed radio access technology. For example, Third Generation Partnership Project (3GPP) Long Term Evolution (LTE) is a competitive radio access technology for efficient support of MTC.

Lower cost MTC devices facilitate and expedite implementation of the concept known as the "internet of things". In many applications, MTC devices may require low operational power consumption and may communicate with infrequent and short-duration burst transmissions. In addition, MTC devices deployed deep inside buildings may require coverage enhancement in comparison to a defined LTE cell coverage footprint.

3GPP LTE Rel-12 has defined an MTC UE power saving mode that facilitates longer battery life and a new MTC UE category that facilitates reduced modem complexity. Work in Rel-13 is expected to further reduce UE cost and provide coverage enhancement.

For operators to serve MTC devices within a deployed radio access network, such as an LTE network, the MTC devices share the uplink and downlink channels available in the network with traditional UEs such as smartphones, tablets, etc. In an LTE system the available uplink and downlink channels may be described in frequency domain by certain bandwidth or sub-channels and in the time domain by certain subframes. Portions of the available bandwidth and subframes may be allocated for transmission of control information, for user data, or both.

For example, downlink transmissions may be dynamically scheduled. In each subframe a base station may transmit control information about which wireless device may transmit on which resources. The downlink control information may be carried by the physical downlink control channel (PDCCH). Uplink data transmissions may also be dynamically scheduled using the PDCCH. Unlike in downlink, however, traditional uplink data transmission occurs in a predefined number of subframes after the PDCCH. The uplink channel carrying the uplink data may be referred to as the Physical Uplink Shared Channel (PUSCH). A wireless device may also transmit channel quality information in the uplink.

Sounding Reference Symbol (SRS) is a type of uplink transmission used for measuring signal quality. A wireless device transmits an SRS signal to a base station at a particular frequency during a particular subframe. The base station receives the SRS and determines a quality associated with the received signal. The base station may make scheduling and/or resource allocation decisions based on the determined signal quality. SRS is traditionally transmitted in particular subframes. Like other parameters in LTE, resources used for SRS transmission may be signaled to a wireless device from a base station.

MTC devices may include optimizations to facilitate energy efficient operation and relatively low cost of manufacturing. MTC devices also co-exists with traditional UEs in the existing framework of an operators wireless network. To co-exist, MTC devices may share the uplink and downlink resources of the wireless network.

SUMMARY

MTC device cost reduction may be achieved, in particular embodiments, by reducing the amount of radio frequency bandwidth an MTC device uses to communicate with a wireless radio node. An MTC device may use less bandwidth than the wireless system bandwidth available to traditional wireless devices. A reduced bandwidth MTC device, however, may not be able to use the same uplink or downlink resource mappings as used by traditional wireless devices within the wireless system. An objective of the present disclosure is to obviate at least this disadvantage and provide an improved method of communication between a wireless device, such as an MTC device, and a wireless radio node.

According to some embodiments, a method of operating a wireless device in a wireless system comprises allocating a first uplink sub-channel to the wireless device in a first subframe associated with the wireless device. The first uplink sub-channel comprises a portion of an uplink system bandwidth, and portions of the uplink system bandwidth outside of the first uplink sub-channel are not available for transmission in the first subframe by the wireless device. The method further comprises determining a first sounding reference signal (SRS) sub-channel. The first SRS sub-channel comprises a portion of the first uplink sub-channel in frequency domain, and the SRS sub-channel is available for transmitting SRS in the first subframe by the wireless device.

According to some embodiments, allocating the first uplink sub-channel to the wireless device comprises selecting the first uplink sub-channel from a plurality of potential uplink sub-channels, wherein each of the plurality of uplink sub-channels is associated with one of a plurality of SRS sub-channels.

According to some embodiments, the method comprises configuring frequency hopping of the uplink sub-channel, wherein a second uplink sub-channel is allocated in a second subframe for the wireless device. The second uplink sub-channel comprises a portion of an uplink system bandwidth, and the second uplink sub-channel is different from the first uplink sub-channel in frequency domain.

According to some embodiments, the method comprises configuring one or more symbols of the first subframe for SRS transmission of the wireless device.

According to some embodiments, the method comprises receiving a first SRS transmission within the first uplink sub-channel from the wireless device and receiving a second SRS transmission within a second uplink sub-channel from the wireless device. The method further comprises determining, based on the first SRS transmission received from the wireless device and the second SRS transmission received from the wireless device, a preferred uplink sub-channel.

According to some embodiments, the method comprises allocating a second uplink sub-channel associated with the wireless device and transmitting an indication of the allocated second uplink sub-channel to the wireless device. The method further comprises transmitting a frequency hopping signal to the wireless device. The frequency hopping signal indicates a frequency position of where to transmit SRS on the first uplink sub-channel and a frequency position of where to transmit SRS on the second uplink sub-channel.

According to some embodiments, the method comprises determining a frequency hopping signal specifying a pattern of SRS frequency positions for transmitting SRS over time and transmitting the frequency hopping signal to the wireless device. The method further comprises receiving a SRS transmission from the wireless device when a frequency position of the SRS sub-channel included in the first uplink sub-channel corresponds to a SRS frequency position specified by the frequency hopping signal.

According to some embodiments, a method of transmitting SRS from a wireless device to a wireless radio node of a wireless system comprises receiving, from the wireless radio node, an indication of an allocated first uplink sub-channel in a first subframe. The first uplink sub-channel comprises a portion of an uplink system bandwidth, and portions of the uplink system bandwidth outside of the first uplink sub-channel are not available for transmission in the first subframe by the wireless device. The method further comprises receiving an indication of a first SRS sub-channel. The first SRS sub-channel comprises a portion of the first uplink sub-channel in frequency domain, and the SRS sub-channel is available for transmitting SRS in the first subframe by the wireless device.

According to some embodiments, the method further comprises receiving an indication of an allocated second uplink sub-channel from the wireless radio node and tuning a transmitter of the wireless device to operate at a radio frequency associated with the second uplink sub-channel.

According to some embodiments, the method further comprises transmitting SRS to the wireless radio node on the SRS sub-channel included in the first uplink sub-channel and transmitting SRS to the wireless radio node on the SRS sub-channel included in the second uplink sub-channel. The method further comprises receiving an indication of a preferred uplink sub-channel from the wireless radio node.

While an MTC device is described in example embodiments below, in general other wireless device types may use the techniques described herein in order to operate with a fraction, or a portion, of uplink system bandwidth. The wireless radio node may be an eNB in a 3GPP LTE system, a wireless access point providing wireless connection to a wireless device, or any other type of base station in other radio technologies. Moreover, an MTC device in an LTE system may be referred to as a UE of a particular UE category, such as UE category 0 for example. In general, while example embodiments below are described in relation to frequency division duplexing (FDD), the disclosed techniques also apply to systems where uplink system bandwidth is the same as downlink system bandwidth, such as time division duplexing (TDD) systems. The wireless device may operate in full-duplex FDD, or half-duplex FDD, or TDD mode.

Particular embodiments may exhibit some of the following technical advantages. Particular embodiments may facilitate operation of a narrow-band MTC device within the wider system bandwidth of a traditional LTE system. Other technical advantages will be readily apparent to one skilled in the art from the following figures, description and claims.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Particular embodiments are described in FIGS. 1-26 of the drawings, like numerals being used for like and corresponding parts of the various drawings. LTE is used throughout this disclosure as an example cellular system, but the ideas presented herein apply to any wireless communication system.

Figure 1:
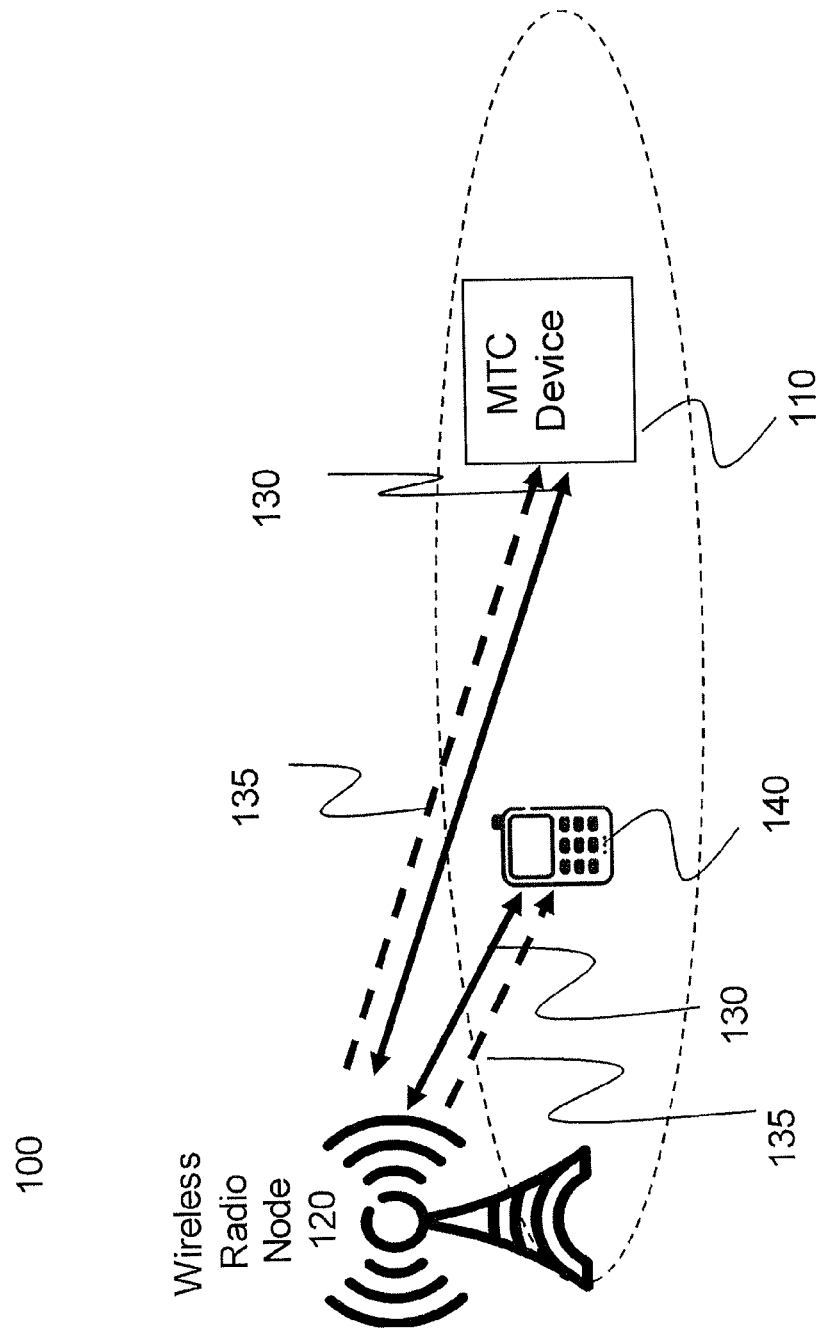
FIG. 1 is a block diagram illustrating an example of a network, according to a particular embodiment.

FIG. 1 is a block diagram illustrating an example of a network, according to a particular embodiment. Network 100 includes wireless radio node 120 (such as a base station or eNodeB), MTC device 110 (such as a control, sensor, monitor, appliance, etc.), and wireless device 140 (such as a mobile phone, smart phone, laptop computer, tablet computer, or another device that can provide wireless communication and user interaction). In general, MTC devices 110 and wireless devices 140 that are within coverage of wireless radio node 120 communicate with wireless radio node 120 by transmitting and receiving wireless signals 130. For example, wireless devices 110 and wireless network nodes 120 may communicate wireless signals 130 containing voice traffic, data traffic, and/or control signals. Wireless signals 130 may include both downlink transmissions (from wireless radio node 120 to MTC device 110 or wireless device 140) and uplink transmissions (from MTC device 110 or wireless device 140 to wireless radio node 120). As part of an uplink transmission, MTC device 110 or wireless device 140 may transmit sounding reference signals (SRS) 135 to wireless radio node 120. Wireless radio node 120 may use SRS 135 for measuring uplink channel quality.

In network 100, each wireless radio node 120 may use any suitable radio access technology, such as long term evolution (LTE), LTE-Advanced, UMTS, HSPA, GSM, cdma2000, WiMax, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a network may include one or more wireless devices and one or more different types of wireless radio nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as MTC device 110, may include the components described with respect to FIG. 25 below. Similarly, a wireless radio node may include any suitable combination of hardware and/or software. For example, in particular embodiments, a wireless radio node, such as wireless radio node 120, may include the components described with respect to FIG. 26 below.

Figure 2:
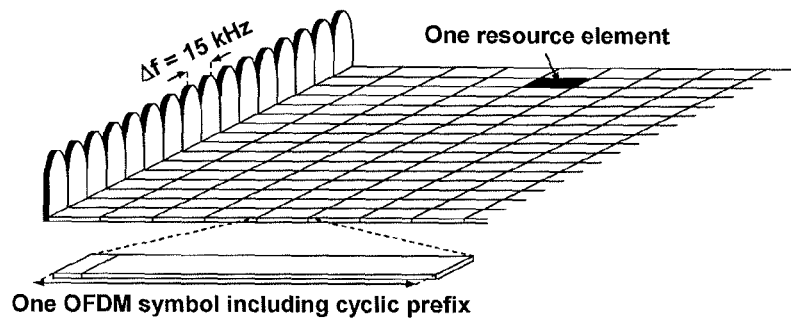
FIG. 2 is an example Orthogonal Frequency-Division Multiplexed (OFDM) symbol, according to a particular embodiment.

FIG. 2 is an example Orthogonal Frequency Division Multiplexing (OFDM) symbol, according to a particular embodiment. LTE uses OFDM in the downlink where each downlink symbol may be referred to as an OFDM symbol, and Discrete Fourier Transform (DFT)-spread OFDM in the uplink, where each uplink symbol may be referred to as an SC-FDMA symbol. The basic LTE downlink physical resource may be illustrated as a time-frequency grid as shown in FIG. 2, where each resource element corresponds to one OFDM subcarrier during one OFDM symbol interval. In the time domain, LTE downlink transmissions may be organized into radio frames.

Figure 3:
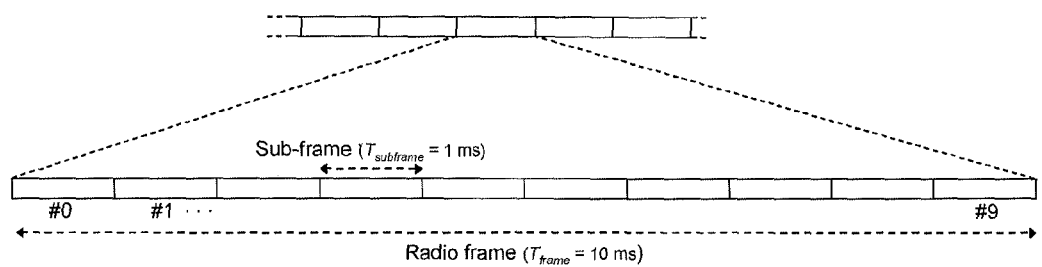
FIG. 3 is an example radio frame, according to a particular embodiment.

FIG. 3 is an example radio frame, according to a particular embodiment. A radio frame is 10 ms and each radio frame consists of ten equally-sized subframes of length $T_{subframe}=1$ ms.

Resource allocation in LTE may be described in terms of resource blocks (RBs), where a resource block corresponds to one slot (0.5 ms) in the time domain and twelve contiguous subcarriers in the frequency domain. A pair of two adjacent resource blocks in the time domain (1.0 ms) may be referred to as a resource block pair. Resource blocks may be numbered in the frequency domain, starting with 0 at one end of the system bandwidth.

LTE also includes the concept of virtual resource blocks (VRB) and physical resource blocks (PRB). The actual resource allocation to a UE is made in terms of VRB pairs. Resource allocations may be localized or distributed. Localized resource allocation directly maps a VRB pair to a PRB pair, hence two consecutive and localized VRB are also placed as consecutive PRBs in the frequency domain. Distributed VRBs are not mapped to consecutive PRBs in the frequency domain, which provides frequency diversity for data channels transmitted using distributed VRBs.

Downlink transmissions may be dynamically scheduled (i.e., in each subframe a base station transmits control information about which wireless devices will receive data and upon which resource blocks the data is transmitted). Downlink Control Information (DCI) may be carried by the Physical Downlink Control Channel (PDCCH). This control signaling may be transmitted in the first 1, 2, 3 or 4 OFDM symbols in each subframe, and the number n=1, 2, 3 or 4 may be referred to as the Control Format Indicator (CFI). The downlink subframe may also contain common reference symbols, which are known to the receiver and used for coherent demodulation of, e.g., the control information.

Figure 4:
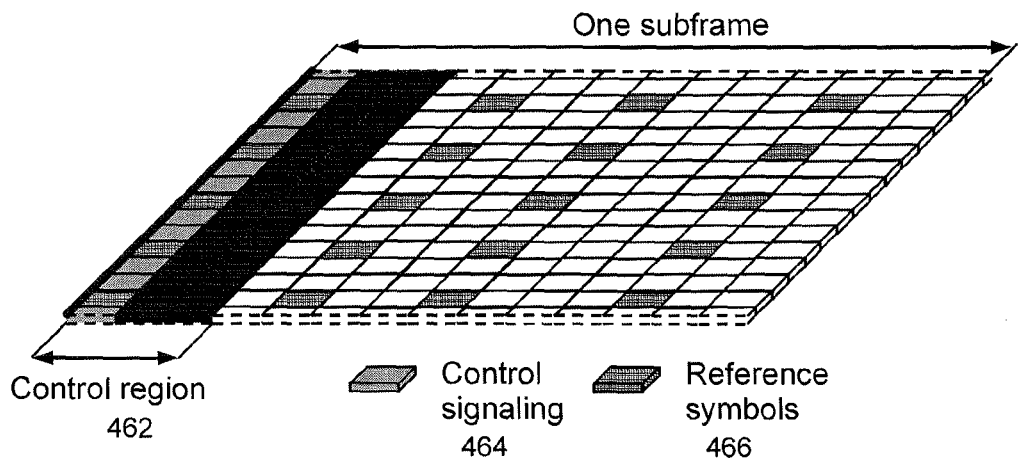
FIG. 4 is an example radio subframe, according to a particular embodiment.

FIG. 4 is an example radio subframe, according to a particular embodiment. The illustrated subframe is a downlink system with CFI=3. Control region 462 comprises the first three OFDM symbols which includes control signaling 464. The illustrated subframe also includes reference symbols 466.

Uplink data transmissions may be dynamically scheduled also using PDCCH. Unlike in downlink, however, uplink data transmission occurs in a predefined number of subframes after the PDCCH. The uplink channel carrying the uplink data may be referred to as Physical Uplink Shared Channel (PUSCH). In addition to PUSCH, a UE may also transmit downlink channel quality information (CQI), HARQ (Hybrid ARQ) ACK/NACK information and scheduling request (SR) to the serving eNB, such as wireless radio node 120, via a Physical Uplink Control Channel (PUCCH).

In particular embodiments, MTC device 110 or wireless device 140 may transmit SRS 135 to wireless radio node 120. Wireless radio node 120 may use SRS 135 for uplink channel quality measurements for frequency-selective scheduling and/or adaption. Wireless radio node 120 may also use SRS 135 for uplink timing estimation and/or uplink power control.

Figure 5:
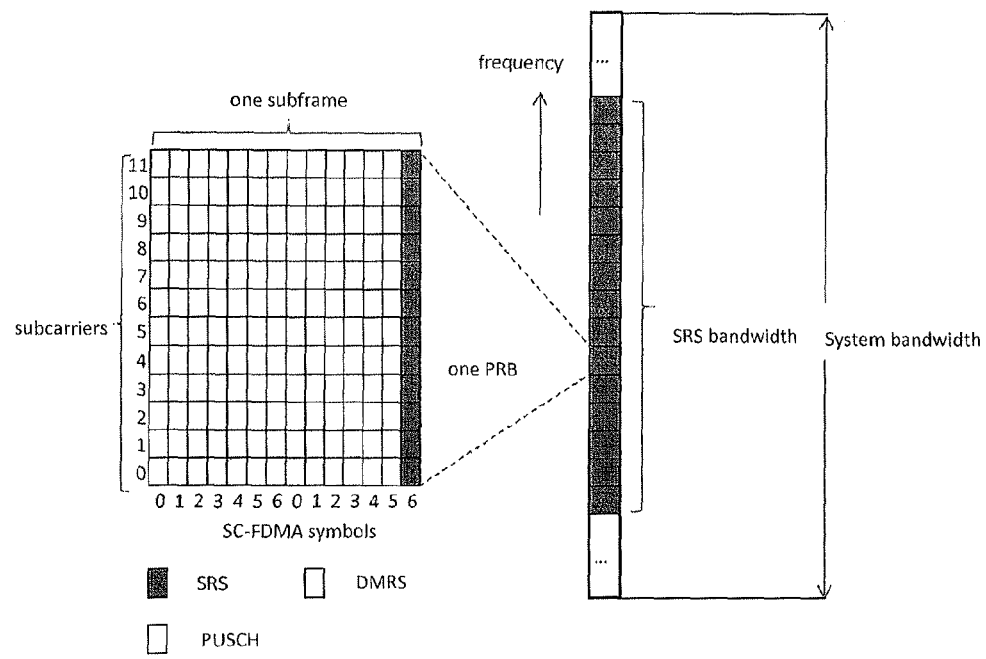
FIG. 5 illustrates an example of Sounding Reference Signal (SRS) within a subframe, according to a particular embodiment.

FIG. 5 illustrates an example of SRS within a subframe, according to a particular embodiment. A UE may traditionally transmit SRS 135 in the last SC-FDMA symbol of a subframe that is configured for SRS transmission for that UE, as illustrated.

The subframes in which SRS transmission can occur in a cell may be referred to as cell specific SRS subframes. In particular embodiments, a UE may be configured to transmit SRS on a subset of the cell specific SRS subframes. This subset of the cell specific SRS subframes may be referred to as user specific or UE specific SRS subframes.

Figure 6:
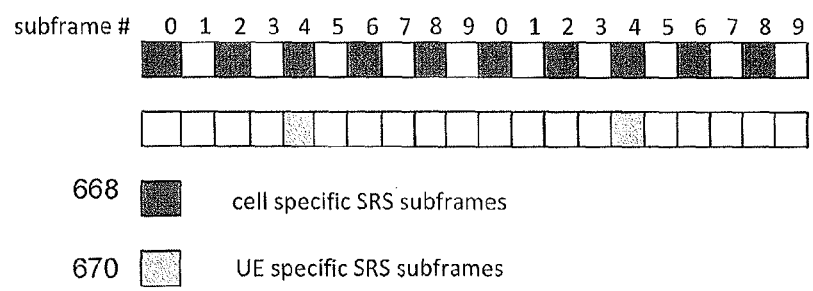
FIG. 6 illustrates an example of cell specific and user specific SRS subframes, according to a particular embodiment.

FIG. 6 illustrates an example of cell specific and user specific SRS subframes, according to a particular embodiment. In particular embodiments, wireless radio node 120 may assign cell specific SRS subframes 668. Of cell specific subframes 668, wireless radio node 120 may assign UE specific subframes 670 to a particular MTC device 110 or wireless device 140.

A UE may be configured with different SRS bandwidths. In general, two kinds of sounding bandwidth may be supported: wideband and narrowband. In wideband sounding configuration, channel measurement over the full bandwidth may be performed in a single subframe. In narrowband sounding configuration, only part of the full bandwidth may be measured in a subframe, and thus multiple SRS subframes may be needed for a full bandwidth channel measurement. Frequency hopping may be supported for narrowband SRS so that different parts of the frequency band may be measured in different subframes.

Furthermore, two types of sounding may be supported: periodic (also referred to as type 0) and a-periodic (also referred to as type 1). In a periodic SRS configuration, a UE may transmit SRS periodically at certain configured SRS subframes. In an a-periodic SRS configuration, a UE may transmit SRS only when requested by an eNB. The SRS subframes for periodic and a-periodic SRS may be separately configured for a UE.

In particular embodiments, the SRS bandwidth of a UE may be configurable in multiples of four resource blocks. A minimum SRS bandwidth may be four resource blocks. In particular embodiments, SRS bandwidth may be configurable in any suitable multiple of resource blocks and any suitable minimum number of resource blocks.

Figure 7:
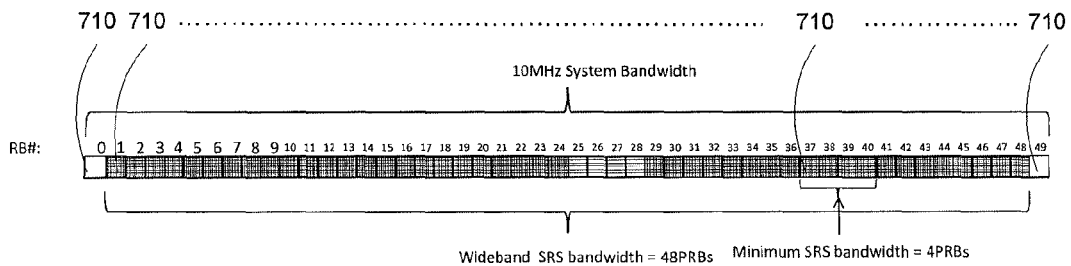
FIG. 7 illustrates an example allocation of SRS bandwidth within a wireless system bandwidth, according to a particular embodiment.

FIG. 7 illustrates an example allocation of SRS bandwidth within a wireless system bandwidth, according to a particular embodiment. The system bandwidth, 10 MHz in the illustrated example, includes fifty resource blocks 710.

In particular embodiments, wireless radio node 120 may allocate a wideband SRS bandwidth of forty-eight resource blocks 710. In particular embodiments, wireless radio node 120 may allocate narrowband SRS bandwidth as one or more allocations of four resource blocks 710.

In a scenario with narrowband SRS and frequency hopping (FH), SRS may be transmitted on different parts of the system bandwidth at different SRS subframes. An example allocation is described below in reference to FIG. 8.

Figure 8:
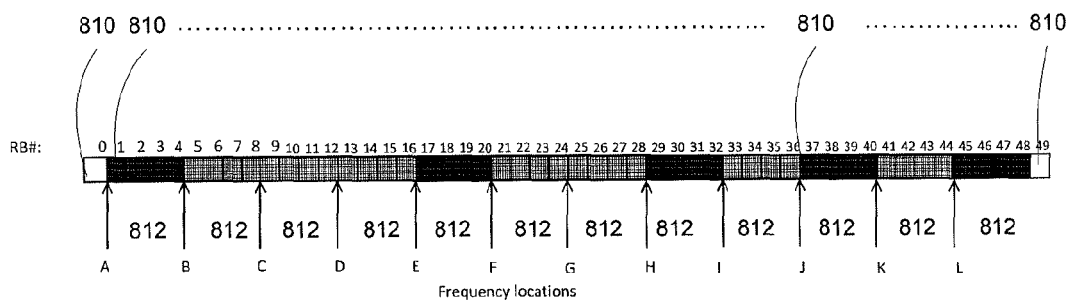
FIG. 8 illustrates an example allocation of SRS sub-channels within a wireless system bandwidth, according to a particular embodiment.

FIG. 8 illustrates an example allocation of SRS sub-channels within a wireless system bandwidth, according to a particular embodiment. The system bandwidth, 10 MHz in the illustrated example, includes fifty resource blocks 810. In particular embodiments, forty-eight resource blocks 810 may be allocated into twelve SRS sub-channels 812. Each SRS sub-channel 812 includes four resource blocks 810. Example locations in the frequency domain for each SRS sub-channel 812 are illustrated as positions A-L. In this example, the entire bandwidth may be measured after twelve SRS subframes. In this example, the SRS sub-channel refers to the portion of uplink system bandwidth that is configured for SRS transmission in a given subframe. In a given subframe, the SRS transmission may be limited to a single SC-FDMA symbol in the time domain, or the SRS transmission may occupy more than one SC-FDMA symbol in the time domain.

In particular embodiments, SRS 135 may comprise a phase-shifted Zadoff-Chu sequence. One or more UEs may be multiplexed on the same time-frequency resources by assigning different phase shifts, referred to as cyclic shifts (CS). Particular embodiments may define eight cyclic shifts. In particular embodiments, SRS 135 may be transmitted on half of the subcarriers in the configured SRS bandwidth, such as the even-numbered subcarriers or the odd-numbered subcarriers. The particular subcarriers may be configurable through a parameter referred to as comb. In particular embodiments, up to sixteen UEs may be multiplexed on a resource block configured for SRS transmission.

In particular embodiments, UEs with different SRS bandwidths may be multiplexed on a SRS subframe with different comb values. UEs with the same SRS bandwidth may be multiplexed in a SRS subframe with different cyclic shifts.

In particular embodiments, an SRS sequence with cyclic shift $\alpha_{\tilde{p}}$ over a UE's transmit antenna port $\tilde{p} \in \{0,1,2,3\}$ may be defined as $$r_{SRS}^{(\tilde{p})}(n) = r_{u,v}^{(\alpha_{\tilde{p}})}(n) = e^{j\alpha_{\tilde{p}} n} \bar{r}_{u,v}(n), 0 \leq n \leq M_{sc}^{SRS}$$

where $\bar{r}_{u,v}(n)$ is a base sequence, $M_{sc}^{SRS} = mN_{sc}^{RB}/2$ is the length of the SRS sequence where m is the number of resource blocks configured for a UE's SRS bandwidth and $N_{sc}^{RB}$ is the number of subcarriers in a resource block. The cyclic shift $\alpha_{\tilde{p}}$ of the sounding reference signal is given as $$\alpha_{\tilde{p}} = 2\pi \frac{n_{SRS}^{cs,\tilde{p}}}{8}$$

$$n_{SRS}^{cs,\tilde{p}} = \left(n_{SRS}^{cs} + \frac{8\tilde{p}}{N_{ap}}\right) \mod 8,$$

$$\tilde{p} \in \{0, 1, \ldots, N_{ap} - 1\}$$

where $n_{SRS}^{cs} = \{0,1,2,3,4,5,6,7\}$ is configured separately for periodic and a-periodic SRS by a higher layer signaling for each UE, and $N_{ap}$ is the number of antenna ports used for SRS transmission.

Particular embodiments may support the following cell specific SRS configuration parameters:

Cell specific SRS subframes may be configured by a 4-bit parameter srs-SubframeConfig. This parameter may define fifteen possible sets of subframes in which SRS may be transmitted within each radio frame. In particular embodiments, the sixteenth configuration may switch off SRS. Each configuration may define a cell specific subframe configuration period $T_{SFC}$ and a cell-specific subframe offset $\Delta_{SFC}$ for the transmission of sounding reference signals.

SRS bandwidth $C_{SRS} \in \{0,1,2,3,4,5,6,7\}$ may be configured by parameter srs-BandwidthConfig. The actual bandwidth may also depend on the system bandwidth. For a given system bandwidth, each configuration may define four possible UE specific SRS bandwidth configurations.

Particular embodiments may support the following UE specific SRS configuration parameters:

Transmission comb $\bar{k}_{TC} \in \{0,1\}$ may be configured by parameter transmissionComb for periodic transmission, or by transmissionComb-ap for each configuration of a-periodic transmission.

Frequency domain position $n_{RRC}$ may be configured by a 5-bit parameter freqDomainPosition for periodic transmission, or by freqDomainPosition-ap for each configuration of a-periodic transmission.

UE specific SRS subframes may be configured by a 20-bit parameter srs-ConfigIndex $I_{SRS}$. This parameter may define a SRS periodicity $T_{SRS}$ and a SRS subframe offset $T_{offset}$. As a particular example, the Evolved Universal Terrestrial Radio Access (E-UTRA) physical layer procedures defined in 3GPP TS 36.213 specifies particular values in Table 8.2-1 and Table 8.2-2 for trigger type 0. As another example, 3GPP TS 36.213 specifies particular values in Table 8.2-4 and Table 8.2-5 for trigger type 1. In particular embodiments, $T_{SRS} \in \{2, 5, 10, 20, 40, 80, 160, 320\}$ may be a UE-specific periodicity of SRS transmission defined in clause 8.2 of 3GPP TS 36.213. In particular embodiments, $T_{offset}$ may be an SRS subframe offset defined in Table 8.2-2 of 3GPP TS 36.213. In particular embodiments, $T_{offset\_max}$ may be a maximum value of $T_{offset}$ for a certain configuration of SRS subframe offset.

UE specific SRS bandwidth may be configured by the parameter srs-Bandwidth, where $B_{SRS} \in \{0,1,2,3\}$. For a given system bandwidth, the parameter may define the SRS bandwidth for a UE.

Frequency hopping may be configured by the parameter srs-HoppingBandwidth, where $b_{hop} \in \{0,1,2,3\}$. Frequency hopping may be enabled if $b_{hop} < B_{SRS}$.

Cyclic shift $n_{SRS}^{cs} = \{0,1,2,3,4,5,6,7\}$ may be configured by the parameter cyclicShift for periodic SRS configuration and the parameter cyclicShift-ap for each configuration of a-periodic SRS configuration.

In some embodiments, if a wireless device has not been assigned an uplink resource for data transmission (i.e. PUCCH transmission), the Layer 1 and/or Layer 2 (L1/L2) control information (downlink channel-status reports, hybrid-ARQ acknowledgments, and scheduling requests) may be transmitted over PUCCH in uplink resources (resource blocks) specifically assigned for transmitting uplink L1/L2 control information (UCI).

Figure 9:
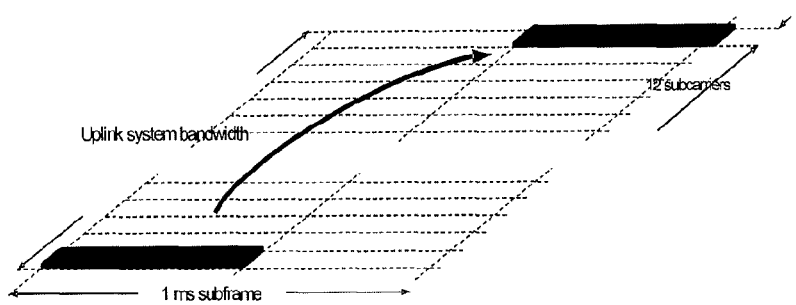
FIG. 9 illustrates an example allocation of Physical Uplink Control Channel (PUCCH) resources, according to a particular embodiment.

FIG. 9 illustrates an example allocation of Physical Uplink Control Channel (PUCCH) resources, according to a particular embodiment. As illustrated, the uplink resources for PUCCH may be located at the edges of the total available cell bandwidth. Each such resource may comprise twelve subcarriers (one resource block) within each of the two slots of an uplink subframe. To provide frequency diversity, in particular embodiments, these frequency resources frequency hop on the slot boundary (i.e., one resource comprises twelve subcarriers at the upper part of the spectrum within the first slot of a subframe and an equally sized resource at the lower part of the spectrum during the second slot of the subframe or vice versa). In particular embodiments, if more resources are needed for the uplink L1/L2 control signaling (e.g., for large overall transmission bandwidth to support a large number of users) additional resource blocks may be assigned next to the previously assigned resource blocks.

Particular advantages may be associated with MTC devices that consume less power and that communicate with infrequent and short-duration burst transmissions. 3GPP LTE Rel-12 has defined an MTC UE power saving mode that facilitates longer battery life and a new MTC UE category that facilitates reduced modem complexity. Work in Rel-13 is expected to further reduce UE cost and provide coverage enhancement.

An advantage of particular embodiments is that MTC device cost reduction may be achieved by reducing the amount of radio frequency bandwidth an MTC device uses to communicate with a wireless radio node. As a particular example, LTE Rel-13 introduces a reduced UE radio frequency bandwidth of 1.4 MHz in both downlink and uplink within any system bandwidth.

Particular embodiments may support a reduced bandwidth for MTC devices. As a particular example, some embodiments may limit an MTC device uplink radio frequency bandwidth to 1.4 MHz. The bandwidth covered by SRS of an MTC device may also be limited to less than or equal to 1.4 MHz. A bandwidth of 1.4 MHz corresponds to six resource blocks in LTE terminology. In embodiments that define SRS bandwidth as a multiple of four resource blocks, the only available SRS bandwidth is a single allocation of four resource blocks. Of the six resource blocks available for uplink for a Rel-13 MTC device, one resource block may be reserved for PUCCH. The five remaining resource blocks may potentially carry SRS.

In traditional wireless systems, the SRS may occupy a bandwidth (may involve hopping) wider than the currently used uplink data transmission bandwidth to provide uplink channel sounding for a wider bandwidth. A narrowband MTC may not be able to use traditional SRS design to provide uplink channel sounding for a wide bandwidth.

In particular embodiments, particular combinations of SRS and uplink sub-channel definitions may facilitate operating a narrowband MTC device in a traditional LTE system. In particular embodiments, a wireless radio node may define an uplink sub-channel definition based on a particular cell specific SRS configuration. In a particular embodiment, a wireless radio node may select particular uplink sub-channels by sharing MTC channel sounding resources with traditional UEs. In a particular embodiment, a wireless radio node may define MTC channel sounding resources independent from traditional UE channel sounding resources. Particular embodiments may use any suitable combination of the preceding.

The following example embodiments describe a narrowband MTC device that may operate with a reduced radio frequency bandwidth of 1.4 MHz in the uplink. The 1.4 MHz may reside anywhere within the system bandwidth that the wireless radio node is using for the cell. Although particular embodiments are described in relation to a 1.4 MHz bandwidth, other embodiments may use any suitable subset of the system bandwidth.

Figure 10:
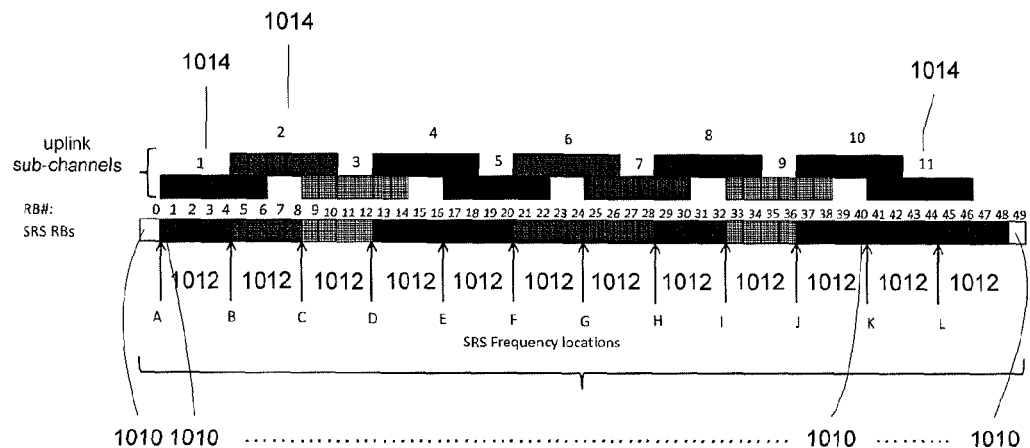
FIGS. 10-11 illustrate example uplink sub-channel allocations, according to particular embodiments.
Figure 11:
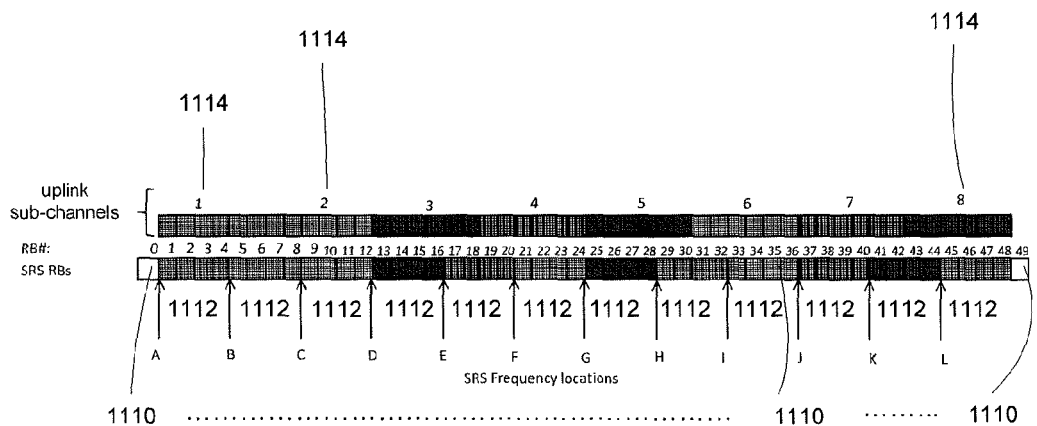

FIGS. 10-11 illustrate example uplink sub-channel allocations, according to particular embodiments. Potential uplink sub-channels within a system bandwidth may be defined based on an SRS configuration such that each uplink sub-channel is aligned with a four resource block SRS starting location. Because 1.4 MHz is equivalent to six resource blocks, potential uplink sub-channels may overlap.

FIG. 10 illustrates an example embodiment where each potential uplink sub-channel coincides with the starting resource block of an SRS sub-channel. The system bandwidth, 10 MHz in the illustrated example, includes fifty resource blocks 1010. In particular embodiments, forty-eight resource blocks 1010 may be allocated into twelve SRS sub-channels 1012. Each SRS sub-channel 1012 includes four resource blocks 1010. Example locations in the frequency domain for each SRS sub-channel 1012 are illustrated as positions A-L. Each potential uplink sub-channel 1014 includes six resource blocks 1010. As illustrated, each potential uplink sub-channel 1014 coincides with starting resource block 1010 of one of SRS sub-channel 1012. The first two resource blocks 1010 of a potential uplink sub-channel 1014 may overlap with the last two resource blocks 1010 of another potential uplink sub-channel 1014.

In particular embodiments, MTC device 110 may scan the entire system bandwidth by tuning to different uplink sub-channels 1014 at different SRS subframes and transmitting SRS 135 in the first four resource blocks 1010 (lowest frequency) in each of the uplink sub-channels 1014. The illustrated uplink sub-channel 1014 definition comprises a one-to-one correspondence between each SRS sub-channel 1012 and potential uplink sub-channel 1014.

FIG. 11 illustrates an example embodiment with non-overlapping potential uplink sub-channels. The system bandwidth, 10 MHz in the illustrated example, includes fifty resource blocks 1110. In particular embodiments, forty-eight resource blocks 1110 may be allocated into twelve SRS sub-channels 1112. Each SRS sub-channel 1112 includes four resource blocks 1110. Example locations in the frequency domain for each SRS sub-channel 1112 are illustrated as positions A-L. Each potential uplink sub-channel 1114 includes six resource blocks 1010. As illustrated, the relative position of resource blocks 1110 for SRS transmission within uplink sub-channel 1114 may vary. For example, SRS may be transmitted in the first four resource blocks 1110 in the first uplink sub-channel 1114. SRS may be transmitted in the last four resource blocks 1110 in the second uplink sub-channel 1114.

In the illustrated example, some potential SRS sub-channels 1112 do not correspond to one of potential uplink sub-channels 1114. In such embodiments, these potential SRS sub-channels may not be used for SRS transmission by an MTC device. This may occur when SRS sub-channel 1112 is not fully contained within one of potential uplink sub-channels 1114. For example, SRS sub-channels 1112 at positions B, E, H and K do not correspond to any potential uplink sub-channel 1114.

In the example embodiments illustrated in FIGS. 10 and 11, PUCCH for the MTC device may be allocated to the resource block at the opposite end of the uplink sub-channel from the resource blocks used for SRS transmission. In particular embodiments, PUCCH resource blocks and SRS resource blocks do not overlap. As an example in reference to FIG. 11, PUCCH may be allocated to the sixth resource block 1110 of the first potential uplink sub-channel 1114 and to the first resource block 1110 of the second uplink sub-channel 1114. As an example in reference to the overlapping potential uplink sub-channels of FIG. 10, PUCCH may be allocated to the sixth resource block of each potential uplink sub-channel because the SRS sub-channel coincides with the first four resource blocks of the uplink sub-channel.

Figure 12:
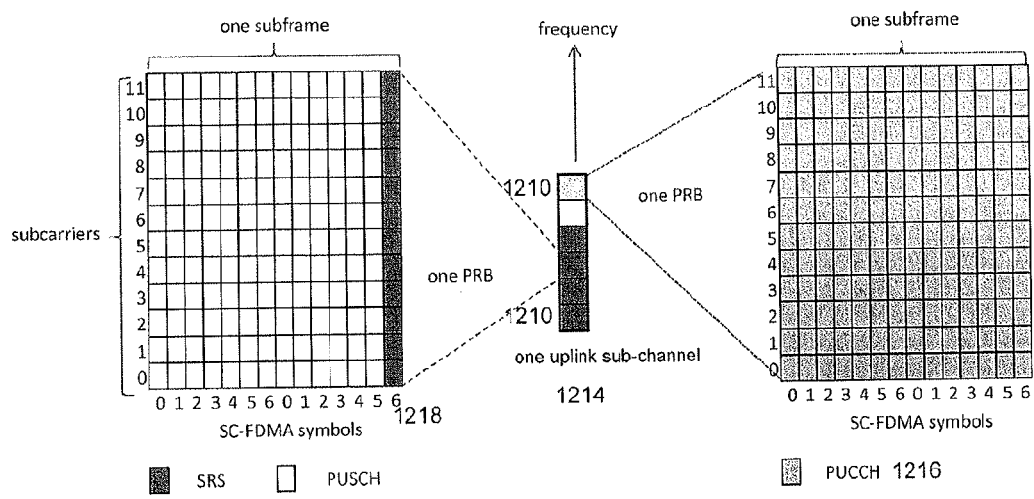
FIGS. 12-15 illustrate example allocations of SRS sub-channels and PUCCH within an uplink sub-channel, according to particular embodiments.

FIGS. 12-15 illustrate example allocations of SRS sub-channels and PUCCH within an uplink sub-channel, according to particular embodiments. FIG. 12 illustrates one uplink sub-channel 1214 comprising six resource blocks 1210. The four lowest frequency resource blocks 1210 comprise an SRS sub-channel. Each of the resource blocks 1210 of the SRS sub-channel may include SRS in the last SC-FDMA symbol 1218 of the subframe. The highest frequency resource block 1210 of uplink sub-channel 1214 contains PUCCH 1216.

Figure 13:
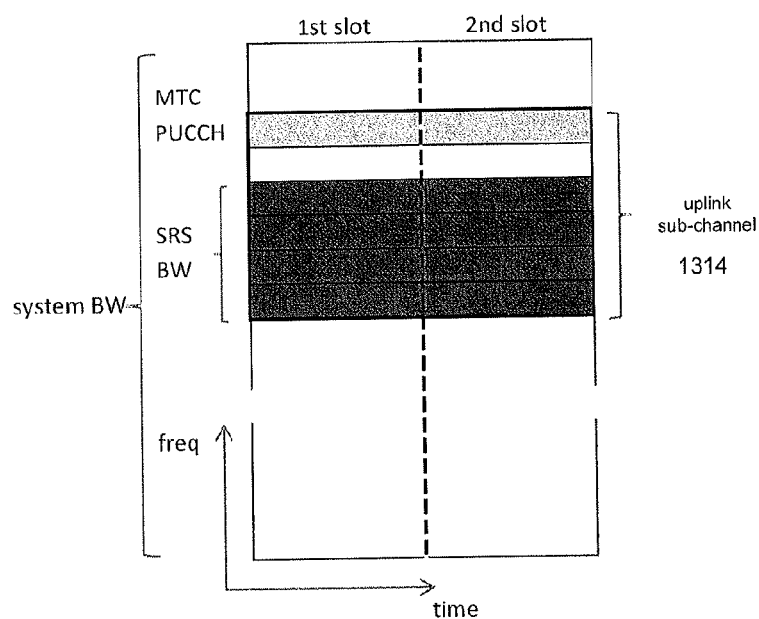

FIG. 13 illustrates an uplink sub-channel within each of the two slots of an uplink subframe, according to particular embodiments. Uplink sub-channel 1314 may represent the two slots of an uplink subframe corresponding to uplink sub-channel 1214 illustrated in FIG. 12. PUCCH occupies the first and second slot of the same resource block. The resource block is the highest frequency resource block within the six resource block uplink sub-channel.

Figure 14:
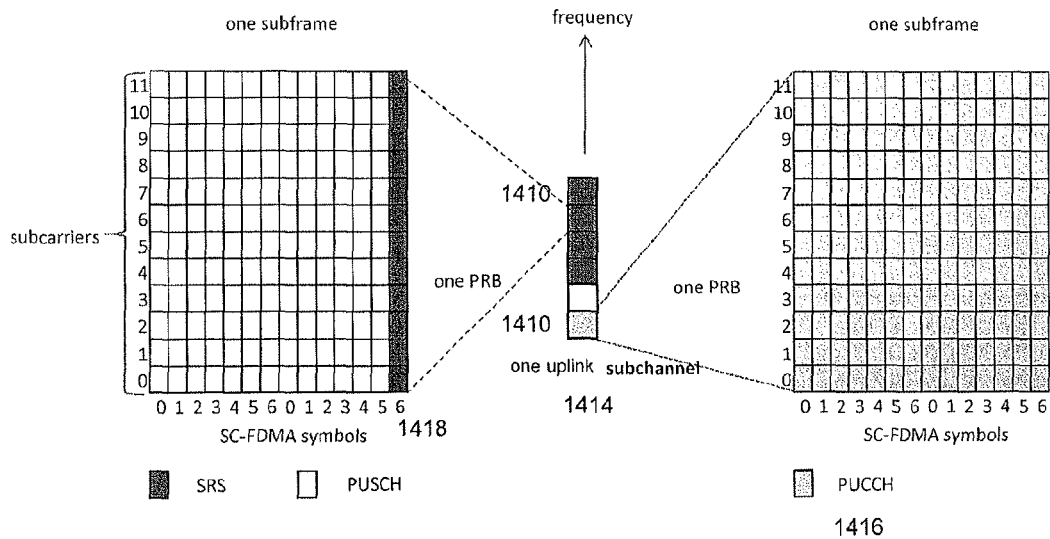

FIG. 14 illustrates another example allocation of SRS sub-channels and PUCCH within an uplink sub-channel, according to particular embodiments. Uplink sub-channel 1414 comprises six resource blocks 1410. The four highest frequency resource blocks 1410 comprise an SRS sub-channel. Each of the resource blocks 1410 of the SRS sub-channel may include SRS in the last SC-FDMA symbol 1418 of the subframe. The lowest frequency resource block 1410 of uplink sub-channel 1414 contains PUCCH 1416.

Figure 15:
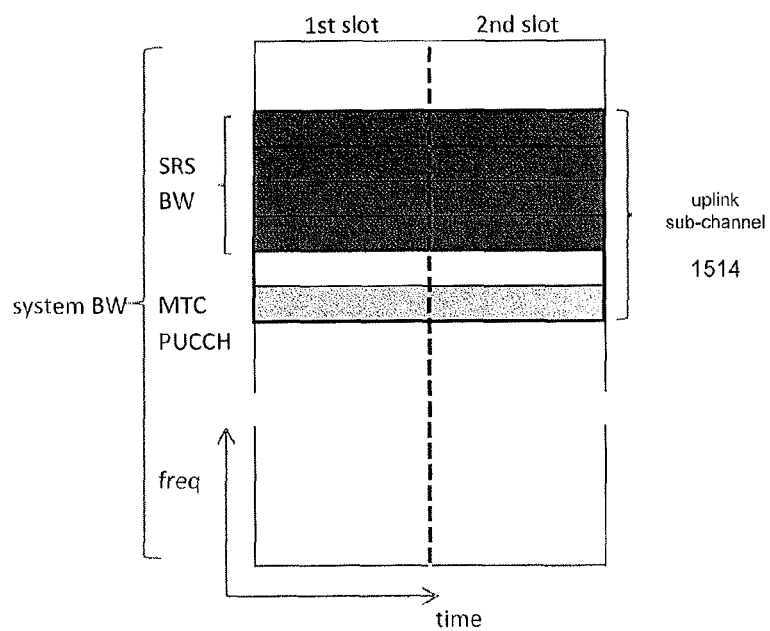

FIG. 15 illustrates an uplink sub-channel within each of the two slots of an uplink subframe, according to particular embodiments. Uplink sub-channel 1514 may represent the two slots of an uplink subframe corresponding to uplink sub-channel 1414 illustrated in FIG. 14. PUCCH occupies the first and second slot of the same resource block. The resource block is the lowest frequency resource block within the six resource block uplink sub-channel.

Although FIGS. 12-15 assume normal cyclic prefix and the SRS is illustrated as occupying the last single-carrier frequency-division multiple access (SC-FDMA) symbol in a subframe, other SRS formats are possible and will be described in more detail below. In particular embodiments, the maximum SRS bandwidth in a cell may be configured by higher layers. The span of system bandwidth that an MTC device may sound may be contingent on the SRS bandwidth configuration $C_{SRS}$. For example, for uplink bandwidth of $80 < N_{RB}^{UL} \leq 110$, $C_{SRS} \in \{0,1,2,3,4,5,6,7\}$ corresponds to maximum SRS bandwidth of {96, 96, 80, 72, 64, 60, 48, 48}. In this particular example, a maximum uplink bandwidth that a UE may sound is between 48 resource blocks and 96 resource blocks. The system bandwidth $N_{RB}^{UL}$ may comprise an additional limit. If an MTC device uplink sub-channel is linked to SRS bandwidth, then $C_{SRS}$ may determine a maximum uplink bandwidth on which an MTC device may operate.

In particular embodiments, an MTC device with 1.4 MHz bandwidth may operate in an LTE system with a bandwidth wider than 1.4 MHz. In particular embodiments, improved performance may be recognized by operating the MTC device in an uplink sub-channel with the highest signal to interference plus noise ratio (SINR). To identify an uplink sub-channel with the highest SINR, an eNB may measure an uplink channel quality for the MTC device over the full system bandwidth. Using the measurements, the eNB may configure the MTC device to use an uplink sub-channel with a better channel quality. This may be referred to as sub-channel selection.

To achieve channel measurement over the full system bandwidth of a cell, in particular embodiments, an MTC device may transmit a sounding signal over the full system bandwidth. Different sub-channels may be sounded and/or measured at different subframes in 1.4 MHz increments. To accomplish this, an eNB may configure the MTC device to share SRS resources with traditional (non-MTC) wireless devices in the cell. The eNB may allocate an SRS bandwidth of four resource blocks to the MTC device. The eNB may also enable frequency hopping for the MTC device.

In particular embodiments, the MTC device may scan using the existing SRS configuration with frequency hopping. For each frequency hop, the MTC device may tune its transmitter to the next SRS bandwidth. For example, the MTC device may tune its transmitter to the next SRS bandwidth in 1.4 MHz increments. In particular embodiments, the next SRS bandwidth may be any suitable frequency for use as an uplink sub-channel.

After scanning, the eNB may select an uplink sub-channel for the MTC device according to channel conditions across the uplink system bandwidth. In particular embodiments, the eNB may signal the uplink sub-channel selection via radio resource control (RRC) signaling. In particular embodiments, the eNB may use a suitable communication means to communicate the uplink sub-channel selection to the MTC device.

In particular embodiments, SRS with frequency-hopping may be configured as periodic or a-periodic. For an a-periodic SRS configuration, enhanced physical downlink control channel (EPDCCH) may be used to send a Type 1 trigger for a-periodic SRS. In particular embodiments, the timing between the subframe receiving the trigger and the subframe for SRS transmission may be predefined. For example, the same timing between a PUSCH and the corresponding EPDCCH may be used such that SRS occurs at subframe (n+k), where n is the subframe receiving the EPDCCH and k=>4.

In particular embodiments, an eNB may select an uplink sub-channel considering the needs of MTC device alone (e.g., selecting the sub-channel with the best channel condition). In particular embodiments, an eNB may balance the needs of an MTC device with the needs of other UEs in the cell. In particular embodiments, an eNB may locate the uplink sub-channel towards the edges of the system bandwidth so that other UEs may use a relatively large number of consecutive resource blocks for PUSCH transmission with lower cubic metric of their PUSCH. In particular embodiments, an eNB may select an uplink sub-channel location considering any combination of suitable factors such as cell load and/or the proportion of MTC devices compared to other UEs.

In particular embodiments, MTC devices may operate as frequency-diverse or frequency-selective. Both modes of operation are described below.

In frequency-diverse operation, an uplink sub-channel changes semi-statically. The location of the uplink signal (SRS, PUCCH, PUSCH) of the MTC device may periodically change in the frequency domain. The MTC device may not dwell on a particular uplink sub-channel. If an uplink sub-channel pattern is configured, the uplink signal may follow the pattern by hopping in the frequency domain.

In frequency-selective operation, an MTC device may send SRS on different uplink sub-channels. An eNB may select an operating uplink sub-channel for the MTC device. The MTC device may dwell on the selected sub-channel until the eNB signals the MTC device to change uplink sub-channels. In particular embodiments, the eNB may send a signal to the MTC device indicating on which sub-channel to dwell on for operation. In particular embodiments, the eNB may send a signal to the MTC device to perform another round of scanning.

When an MTC device is operating in a single 1.4 MHz sub-channel, SRS transmission is limited to the six resource blocks of the sub-channel. In frequency-selective operation, if an MTC device is to share the same SRS resources in the cell with legacy UEs, then the MTC SRS may be configured differently depending on whether a frequency hopping pattern is used. Even if a frequency hopping pattern is associated with an MTC device, the actual SRS transmission cannot use frequency hopping once the MTC uplink sub-channel is fixed.

In particular embodiments, SRS for an MTC device may be configured with a bandwidth of four resource blocks and no frequency hopping. The SRS sub-channel is located within the uplink sub-channel. For example, if an MTC device is configured to operate in uplink sub-channel 5 as shown in FIG. 11, then the MTC device may be configured with a four resource block SRS sub-channel starting at frequency location G. Legacy UEs may be configured with a different comb (i.e. on different set of subcarriers). An advantage of this particular example is that the MTC device is able to transmit SRS in all the UE specific SRS subframes configured to it. Legacy UEs may use half of the SRS frequency resources in the cell when legacy UEs and MTC devices are separated by different comb which enables the legacy UE to use arbitrary SRS sequence length and arbitrary cyclic shift.

In particular embodiments, SRS for an MTC device may be configured with a bandwidth of four resource blocks and with frequency hopping. In this embodiment, some legacy UEs may also share the same frequency resource (e.g. comb) and be able to measure uplink channels over the full system bandwidth. The MTC device may transmit SRS when the hopping pattern for a given subframe falls within the MTC device's assigned uplink sub-channel. If the hopping pattern falls outside the MTC device's assigned uplink sub-channel for a given subframe, then the MTC device may not transmit SRS. An example is illustrated in FIG. 16.

Figure 16:
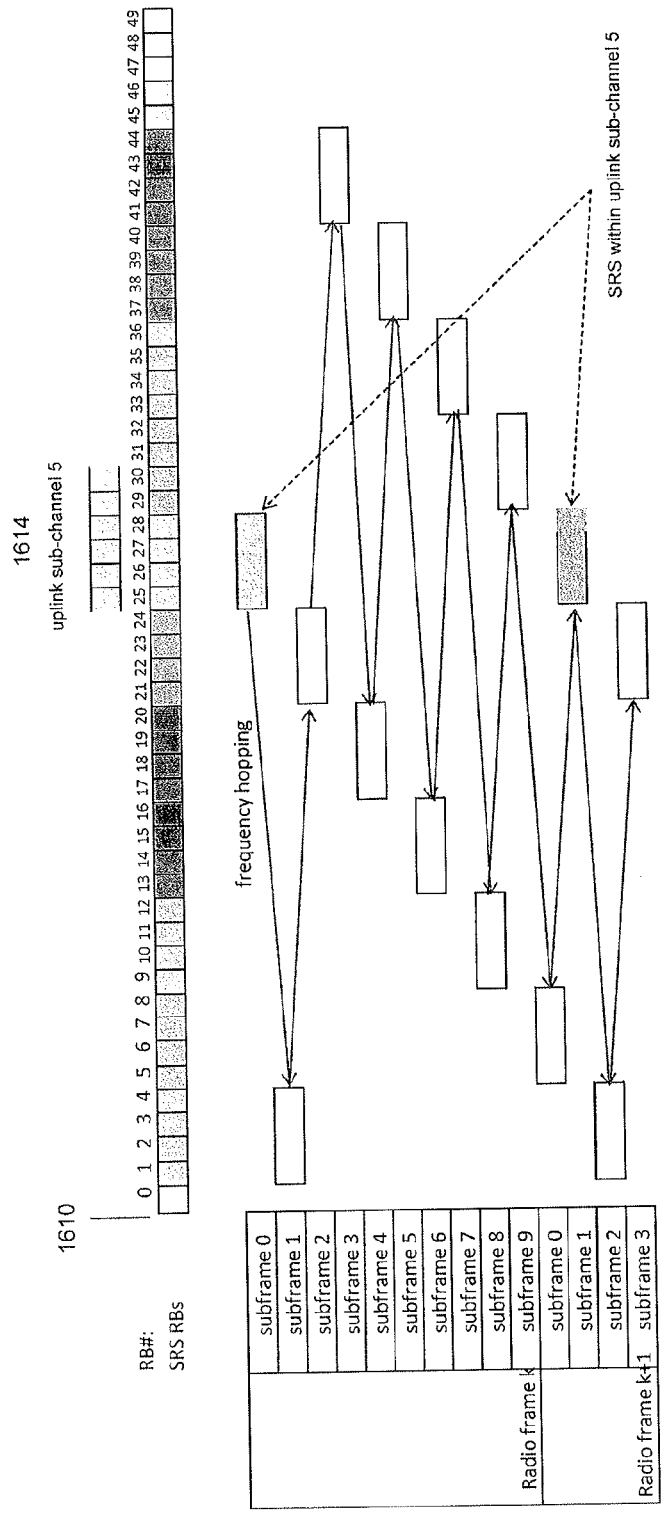
FIG. 16 illustrates an example SRS configuration for an MTC device with frequency hopping, according to a particular embodiment.

FIG. 16 illustrates an example SRS configuration for an MTC device with frequency hopping, according to a particular embodiment. The system bandwidth, 10 MHz in the illustrated example, includes fifty resource blocks 1610. In particular embodiments, forty-eight resource blocks 1610 may be allocated into uplink sub-channels 1614 comprising six resource blocks 1610. An MTC device may operate in the fifth uplink sub-channel 1614 and may be configured with a four resource block SRS sub-channel and configured for frequency hopping. The illustrated hopping pattern is just one example. Particular embodiments may use any suitable hopping pattern.

In the illustrated example, the MTC device may transmit SRS in subframe 0 of radio frame k and subframe 1 in radio frame k+1 even though the SRS may be configured on every subframe. The MTC device may transmit SRS once in a cycle of the frequency hopping pattern. In particular embodiments, an eNB may increase the frequency of SRS transmission of the MTC device by configuring SRS Configuration Index $I_{SRS}$ for the MTC device so that SRS Periodicity $T_{SRS}$ is relatively small (e.g., $T_{SRS} \in \{2, 5, 10\}$ (ms)).

In particular embodiments, efficient use of the SRS resources in a hopping pattern associated with an MTC device may be realized by sharing the same pattern between the MTC device and other UEs. For example, other UEs may be configured to use the same hopping pattern and to transmit SRS in subframes other than subframe 0 of radio frame k and subframe 1 in radio frame k+1.

In particular embodiments, an eNB may configure an MTC device with trigger type 0 and with duration=indefinite (i.e., periodic SRS). The eNB may allocate SRS pattern resources not used by the MTC device to other MTC devices that occupy a different uplink sub-channel. Two or more MTC devices may be configured to share the same SRS configuration, except that each MTC devices utilizes different SRS bandwidth of the same SRS pattern. For example, referring to FIG. 16, a second MTC device may use uplink sub-channel 1614 that starts with the first resource block 1610. The second MTC device may share the SRS configuration by periodically transmitting SRS in subframe 1 of radio frame k and subframe 2 of radio frame (k+1). In particular embodiments, an eNB may reuse the unused SRS instances for trigger type 1 for either MTC devices or legacy UEs.

In particular embodiments, an eNB may configure an MTC device with trigger type 0 and with duration=single, or trigger type 1 (i.e., not periodic). By triggering different wireless devices to transmit SRS at different time, the same SRS configuration may be shared by multiple wireless devices (MTC or otherwise).

Instead of sharing MTC SRS resources with legacy UEs in a cell, particular embodiments may define separate SRS resources for MTC devices. As discussed briefly above, instead of occupying the last SC-FDMA symbol in a subframe, other SRS formats may be defined.

In particular embodiments, an eNB may define MTC SRS in subframes in which there is no SRS configuration in the legacy system. An example is shown in FIG. 17.

Figure 17:
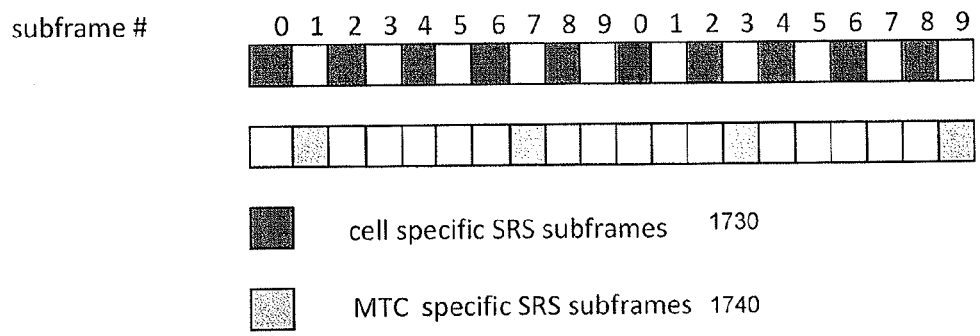
FIG. 17 illustrates an example allocation of cell specific and MTC device specific subframes, according to a particular embodiment.

FIG. 17 illustrates an example allocation of cell specific and MTC device specific subframes, according to a particular embodiment. Cell specific SRS subframes 1730 are defined as subframes 0, 2, 4 and so on. MTC specific SRS subframes 1740 are defined as subframes 1, 7 and so on. In particular embodiments, MTC SRS is still transmitted on the last SC-FDMA symbol in MTC specific SRS subframe 1740.

In particular embodiments, MTC specific SRS subframes 1740 differ from cell specific SRS subframes 1730 of a legacy system, and thus MTC SRS will not collide with legacy SRS. MTC SRS may, however, collide with a PUSCH transmission from a legacy UE because the MTC SRS configuration may not be visible to a legacy UE. If a PUSCH transmission is scheduled for a legacy UE at the same time as an MTC SRS transmission, a legacy UE unaware of the MTC SRS configuration may not shorten the PUSCH to leave the last symbol vacant. In particular embodiments, an eNB that is aware of the MTC SRS configuration may avoid collisions by not scheduling PUSCH for legacy UEs in the MTC SRS time-frequency resources.

In particular embodiments, MTC devices with a PUSCH scheduled in the MTC SRS time-frequency resources may puncture data on the last SC-FDMA symbol, similar to a legacy SRS subframe. In particular embodiments, an MTC device may use the four SRS resource blocks for PUSCH transmission without collision with MTC SRS.

Particular embodiments may define a cell-specific parameter srs-SubframeConfigMTC, which may be provided by higher layers in a common configuration for MTC devices. Parameter srs-SubframeConfigMTC may define possible sets of subframes in which MTC devices may transmit SRS within each radio frame. In addition to time-domain information, this cell-specific parameter may also define frequency domain information so that MTC devices know when and where SRS may occur and a colliding PUSCH may need to be shortened. Such configuration may be applicable to both the scanning stage (i.e., MTC device moves from one uplink sub-channel to another uplink sub-channel) and the operating stage (i.e., MTC device dwells on a given uplink sub-channel).

In particular embodiments, instead of defining SRS in the last SC-FDMA symbol, the SRS for MTC devices may be defined for one or more SC-FDMA symbols in the entire subframe. While one of skill in the art will recognize many definitions are possible, a few examples are given below.

FIGS. 18-22 illustrate example allocations of SRS within a subframe, according to particular embodiments. In particular embodiments, an MTC device may be configured to transmit SRS in the whole subframe (i.e., repeating the same SRS sequence in each available SC-FDMA symbol in the subframe).

Figure 18:
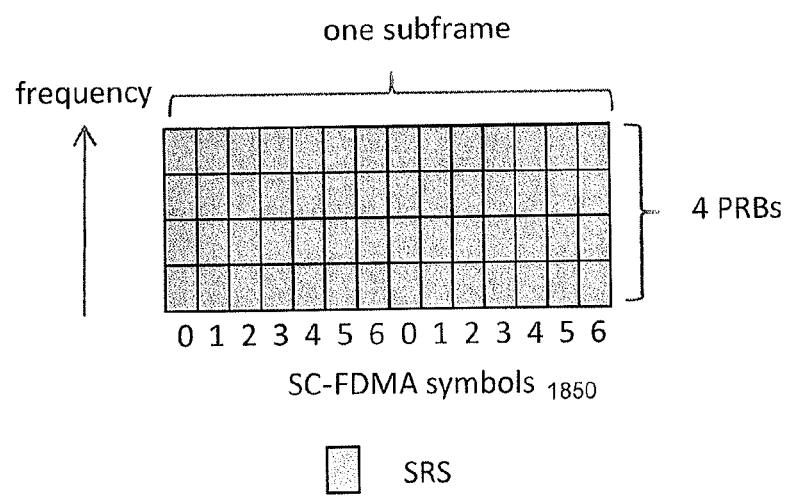
FIGS. 18-22 illustrate example allocations of SRS within a subframe, according to particular embodiments.

FIG. 18 illustrates an example MTC specific SRS subframe in which SRS is transmitted on all SC-FDMA symbols 1850 within a subframe. For normal cyclic prefix using this SRS format, up to sixteen MTC devices may be multiplexed over a single subframe via cyclic shift (eight cyclic shifts) and comb (two combs).

In particular embodiments, an SRS subframe may be shared by multiple MTC devices for SRS transmission. Each MTC device may use a subset of SC-FDMA symbols in the subframe.

Figure 19:
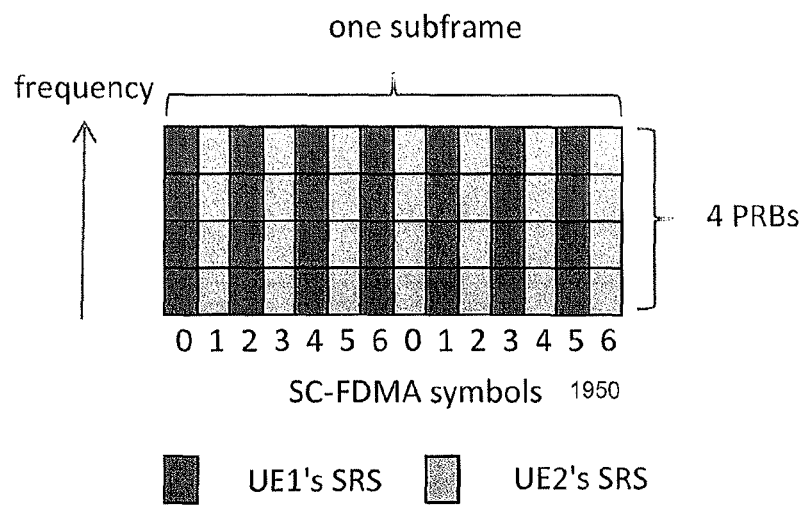

FIG. 19 illustrates an example MTC specific SRS subframe in which two MTC devices are each allocated half of the subframe. MTC device UE1 is allocated on SC-FDMA symbols 1950 {0,2,4,6} in the first slot and SC-FDMA symbols 1950 {1,3,5} in the second slot. MTC device UE2 is allocated on the remaining SC-FDMA symbols 1950. In this embodiment, up to 32 MTC devices may be multiplexed over a single subframe. In particular embodiments, the starting SC-FDMA symbol may be dynamically signaled through (E)PDCCH.

Figure 20:
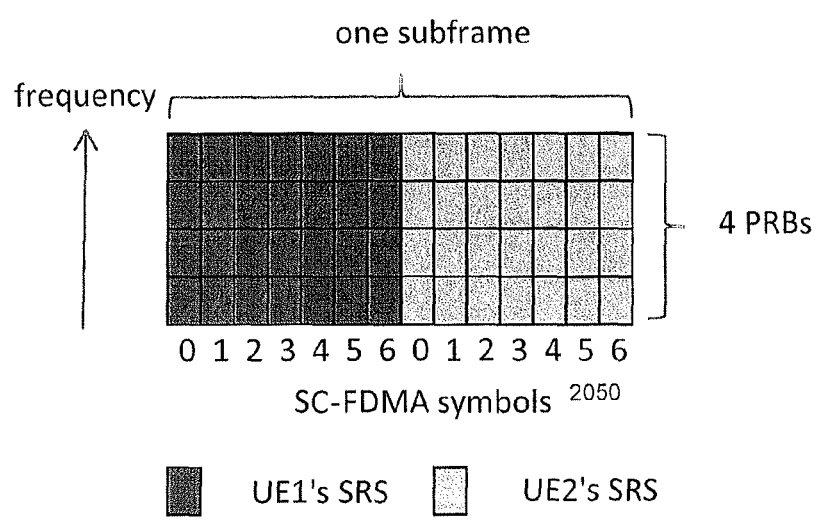

FIG. 20 illustrates another example MTC specific SRS subframe in which two MTC devices are each allocated half of the subframe. In particular embodiments, each MTC device may be allocated with contiguous SC-FDMA symbols 2050 in the subframe. For example, UE1 may be allocated all SC-FDMA symbols 2050 in the first slot and UE2 may be allocated all SC-FDMA symbols 2050 in the second slot, as illustrated. In particular embodiments, an eNB may signal to the MTC devices the SC-FDMA indices where the MTC devices may transmit SRS.

Figure 21:
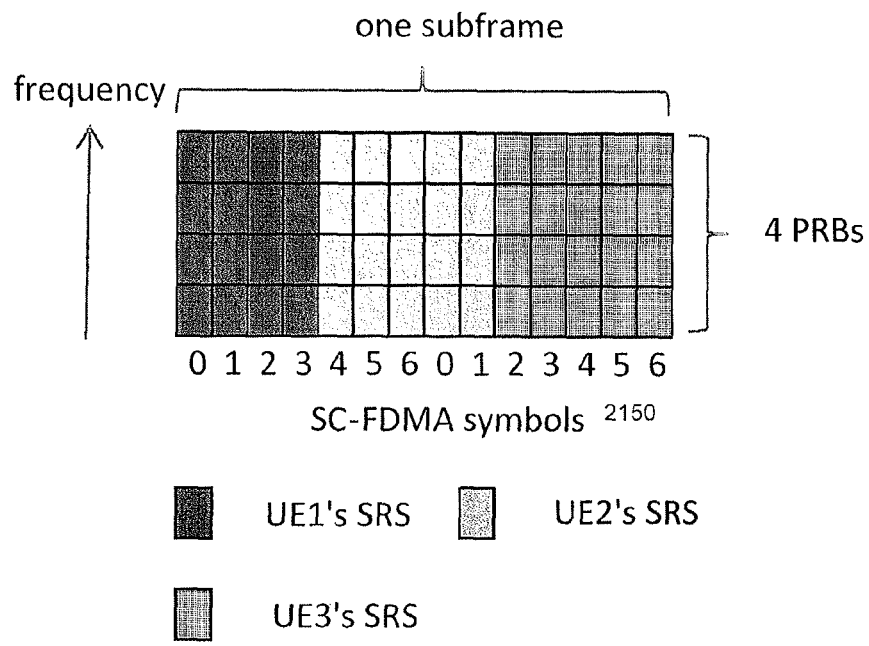

FIG. 21 illustrates an example MTC specific SRS subframe in which three MTC devices are each allocated portions of the subframe. MTC device UE1 is allocated on SC-FDMA symbols 2150 {0,1,2,3} in the first slot. MTC device UE2 is allocated on SC-FDMA symbols 2150 {4,5,6} in the first slot and SC-FDMA symbols 2150 {0,1} in the second slot. MTC device UE3 is allocated on SC-FDMA symbols 2150 {2,3,4,5,6} in the second slot.

Figure 22:
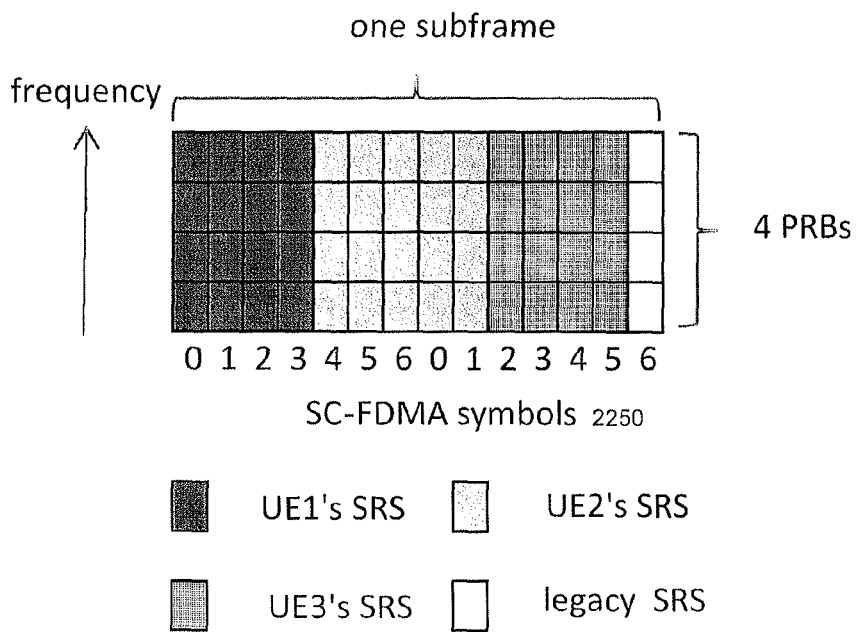

FIG. 22 illustrates another example MTC specific SRS subframe in which three MTC devices are each allocated portions of the subframe. In particular embodiments, the last SC-FDMA symbol 2250 may be punctured to avoid collision with legacy SRS. MTC device UE1 is allocated on SC-FDMA symbols 2250 {0,1,2,3} in the first slot. MTC device UE2 is allocated on SC-FDMA symbols 2250 {4,5,6} in the first slot and SC-FDMA symbols 2250 {0,1} in the second slot. MTC device UE3 is allocated on SC-FDMA symbols 2250 {2,3,4,5} in the second slot.

In particular embodiments, the SRS configuration may be periodic or a-periodic. If only a-periodic SRS is configured for MTC devices, configuration of cell-specific MTC SRS subframes may not be needed. In a-periodic embodiments, SRS transmission may be scheduled similar to PUSCH transmission via (E)PDCCH.

A particular advantage of configuring multiple SC-FDMA symbols in a subframe for SRS transmission is that it may save SRS transmission time. In a coverage enhancement scenario, instead of waiting several subframes to repeat an SRS transmission, an MTC device may perform multiple repetitions in a single subframe. Another advantage of particular embodiments is that MTC devices may save power by reducing their active time. Another advantage is a greater number of MTC devices may multiplex their SRS into a single subframe. In particular embodiments, the number of MTC devices that may be multiplexed in a given subframe is: P×8×2, where P is the number MTC devices multiplexed in time-domain in a subframe.

In particular embodiments, aligning the SRS transmission of many MTC devices into a given subframe facilitates efficient use of resources, even when only a few MTC devices are present in the network. In particular embodiments, large time domain separation between MTC SRS subframes may be configured.

In particular embodiments, SRS configuration may be signaled to an MTC device. An MTC device may benefit from knowing the legacy cell specific SRS configurations in the serving cell. In particular embodiments, an MTC device may use legacy cell specific SRS configuration for purposes such as puncturing the last SC-FDMA symbol in a cell specific SRS subframe in which PUSCH is scheduled and/or sharing SRS resources with the legacy UEs In particular embodiments in which an MTC device shares SRS resources with legacy UEs, the MTC device may receive MTC device specific SRS configuration. The MTC device may interpret the frequency domain configuration parameters in the context of the serving cell system bandwidth and map the frequency domain resources into the uplink sub-channel in which it operates. For example, an MTC device operating in a cell with 10 MHz system bandwidth (as illustrated in FIG. 16) may calculate a frequency domain starting position of an SRS transmission in the 10 MHz system bandwidth using both cell and MTC device specific SRS parameters. The MTC device may determine whether the frequency starting position is within its MTC operating uplink sub-channel (sub-channel 5 in FIG. 16). If the frequency starting position is within the uplink sub-channel, the MTC device may transmit SRS in the subframe (e.g., subframe 0 in radio frame k in FIG. 16). Otherwise, the MTC device may not transmit SRS in the subframe (e.g., subframes 1 to 9 of radio frame k in FIG. 16).

In particular embodiments in which an MTC device only supports a-periodic SRS and an entire subframe or a subset of a subframe is allocated for SRS transmission, the MTC device may operate without certain configuration parameters. For example, the MTC device may not need information about a.) cell and UE specific SRS subframe configuration, b.) cell and UE specific SRS bandwidth configuration, c.) frequency hopping, and/or d.) frequency domain position.

In particular embodiments, certain SRS configuration parameters may be implied. For example, in particular embodiments $N_{ap}$ may equal 1 for all MTC SRS transmissions. In particular embodiments, the number of antenna ports used for SRS transmission may equal one for low-cost MTC devices using a single antenna. In particular embodiments, $N_{ap}=0$ may be used to disable SRS transmission for a given MTC device.

As another example, in particular embodiments $m_{SRS,b}$ may equal 4 and $M_{sc,b}^{RS}=m_{SRS,b}N_{sc}^{RB}/2$ may equal 24. In this particular embodiment, $M_{sc,b}^{RS}$ is the length of the SRS sequence. For any uplink system bandwidth, b values that correspond to $m_{SRS,b}=4$ may be valid for MTC devices.

In particular embodiments, an MTC device may send SRS to a positioning node. As an example, for an uplink time difference-of-arrival (UTDOA) positioning method, an eNB may configure an MTC device to send periodic SRS to an Evolved Serving Mobile Location Centre (E-SMLC). In particular embodiments, the eNB may communicate the uplink sub-channel information to the E-SMLC so that multiple Location Measurement Units may simultaneously receive SRS of the MTC device.

In frequency-diverse operation, a serving eNB may configure a periodic pattern that an MTC device follows to hop to different uplink sub-channels in time. The serving eNB may provide the uplink sub-channel hopping pattern to the E-SMLC. In particular embodiments, the E-SMLC may communicate the hopping pattern to one or more LMU.

In frequency-selective operation, a serving eNB may configure an MTC device to dwell on an uplink sub-channel with a periodic SRS configuration. The serving eNB may communicate the dwelled-on uplink sub-channel to the E-SMLC. In particular embodiments, the E-SMLC may communicate the dwelled-on uplink sub-channel to multiple LMU.

Figure 23:
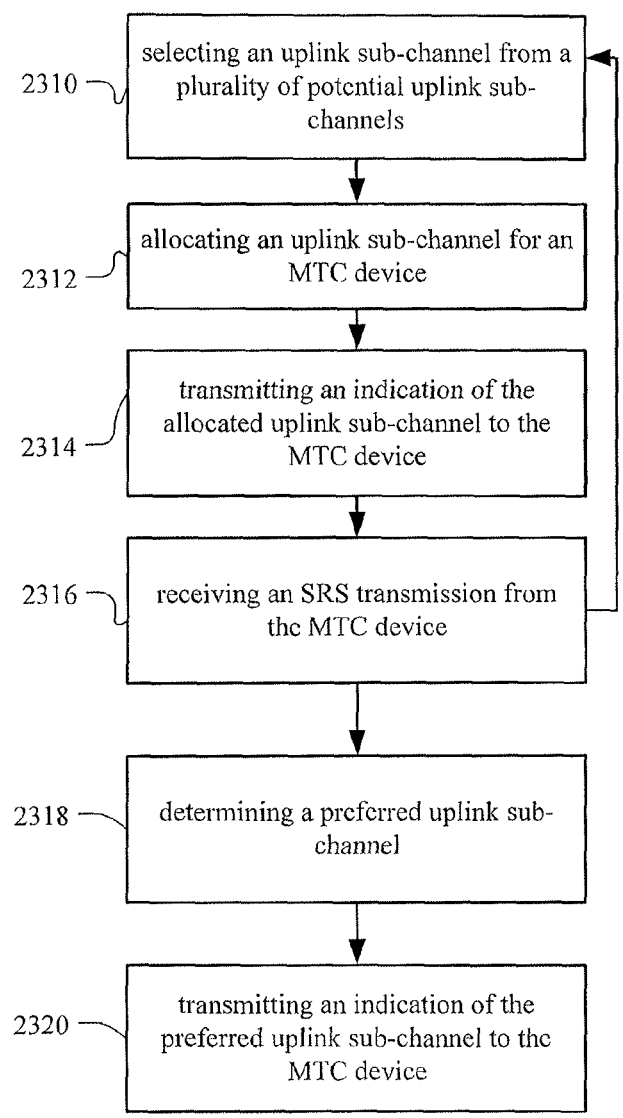
FIG. 23 is a flowchart of an example method of assigning uplink bandwidth of a wireless system to a wireless device, according to a particular embodiment.

FIG. 23 is a flowchart of an example method 2300 of assigning uplink bandwidth of a wireless system to a wireless device, according to a particular embodiment. In particular embodiments, one or more steps of method 2300 may be performed by components of network 100 described with reference to FIGS. 1-22.

The method begins at step 2310, where a wireless radio node, such as wireless radio node 120, selects an uplink sub-channel from a plurality of potential uplink sub-channels. In particular embodiments, the selected uplink sub-channel comprises a portion of an uplink system bandwidth, and portion(s) of the uplink system bandwidth outside of the selected uplink sub-channel in the same subframe are not available for transmission, including transmission of physical uplink control channel (PUCCH). As an example, wireless radio node 120 may select any one of uplink sub-channels 1014 or 1114 described in reference to FIGS. 10 and 11, respectively. The selected uplink sub-channel may include an SRS sub-channel 1012 or 1112. As a particular example in reference to FIG. 16, wireless radio node 120 may select the fifth uplink sub-channel 1614. In particular embodiments, the SRS sub-channel may only occupy a fraction of the subframe (i.e., not utilizing all SC-FDMA symbols in the subframe).

At step 2312, the wireless radio node allocates an uplink sub-channel for an MTC device. For example, wireless radio node 120 may associate the uplink sub-channel selected in step 2310 with a particular MTC device 110. In particular embodiments, wireless radio node 120 may also associate additional configuration parameters with the selected uplink sub-channel and the MTC device. Additional configuration parameters may include a periodicity, a hopping pattern, or any other suitable SRS configuration parameter.

At step 2314, the wireless radio node transmits an indication of the allocated uplink sub-channel to the MTC device. For example, in reference to FIG. 16, wireless radio node 120 may transmit an indication to MTC device 110 that MTC device 110 should use the frequency associated with the fifth uplink sub-channel 1614 for uplink communication with wireless radio node 120. In particular embodiments, wireless radio node 120 may transmit an indication of additional configuration parameters (such as those described in reference to step 2312) to MTC device 110.

In particular embodiments, MTC device 110 receives the uplink sub-channel information from wireless radio node 120. MTC device 110 may tune its uplink transmitter to transmit using a frequency indicated by the received uplink sub-channel information. MTC device 110 may transmit SRS 135 within the SRS sub-channel included in the uplink sub-channel.

At step 2316, the wireless radio node receives an SRS transmission from the MTC device. In particular embodiments, wireless radio node 120 receives SRS 135 from MTC device 110. Wireless radio node 120 may evaluate SRS 135 to determine a signal quality associated with the selected uplink sub-channel. In particular embodiments, MTC device 110 may dwell on the selected uplink sub-channel. MTC device 110 may keep transmitting SRS 135 on the selected uplink sub-channel until wireless radio node 120 transmits another selected uplink sub-channel to MTC device 110.

In particular embodiments, method 2300 may return to step 2310 and select another uplink sub-channel from a plurality of potential uplink sub-channels. For example, wireless radio node 120 may scan the system bandwidth to determine an optimal uplink sub-channel to assign to MTC device 110 by repeating steps 2310 to 2316 any number of times to evaluate the signal quality of multiple uplink sub-channels.

At step 2318, the wireless radio node determines a preferred uplink sub-channel. For example, wireless radio node 120 may evaluate the results of multiple iterations of steps 2310 to 2316 to determine a preferred uplink sub-channel. In particular embodiments, the determination may be based on signal quality, on signal quality within a certain range of the system bandwidth, on the number of MTC and non-MTC devices in the cell, or any combination of suitable evaluation criteria.

At step 2320, the wireless radio node transmits an indication of the preferred uplink sub-channel to the MTC device. In particular embodiments, the preferred uplink sub-channel is the uplink sub-channel determined in step 2318. Particular embodiments may omit steps 2318 and 2320 and MTC device 110 may continue transmitting on the uplink sub-channel received in step 2314. In particular embodiments, the preferred uplink sub-channel indication may also comprise and indication of a preferred hopping pattern.

Modifications, additions, or omissions may be made to method 2300. Additionally, one or more steps in method 2300 of FIG. 23 may be performed in parallel or in any suitable order.

Figure 24:
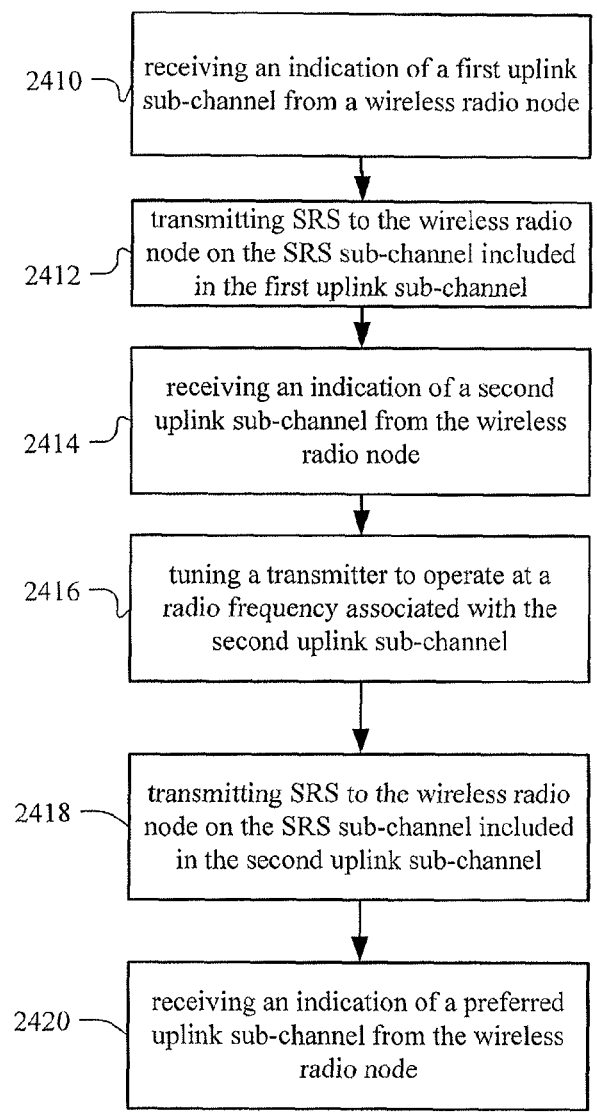
FIG. 24 is a flowchart of an example method of transmitting SRS, according to a particular embodiment.

FIG. 24 is a flowchart of an example method 2400 of transmitting SRS, according to a particular embodiment. In particular embodiments, one or more steps of method 2400 may be performed by components of network 100 described with reference to FIGS. 1-22.

The method begins at step 2410, where an MTC device, such as MTC device 110, receives an indication of a first uplink sub-channel from a wireless radio node, such as wireless radio node 120. For example, MTC device 110 may receive an indication of any one of uplink sub-channels 1014 or 1114 described in reference to FIGS. 10 and 11, respectively. The received uplink sub-channel may include an SRS sub-channel 1012 or 1112. As a particular example in reference to FIG. 16, MTC device 100 may receive an indication of the fifth uplink sub-channel 1614.

In particular embodiments, MTC device 110 may receive additional configuration parameters with the received uplink sub-channel. Additional configuration parameters may include a periodicity, a hopping pattern, or any other suitable SRS configuration parameter.

In particular embodiments, MTC device 110 may receive information similar to that transmitted by wireless radio node 120 described in step 2314 in reference to FIG. 23 above.

At step 2412, the MTC device transmits SRS to the wireless radio node. For example, MTC device 110 may transmit SRS 135 to wireless radio node 120 on SRS sub-channel 1012 or 1112 include in received uplink sub-channel 1014 or 1114. In particular embodiments, MTC device 110 may transmit SRS periodically, according to a hopping pattern, or at any other suitable schedule. In particular embodiments, method 2400 may end here. In other embodiments, method 2400 may continue to step 2414.

At step 2414, in particular embodiments, the MTC device receives an indication of a second uplink sub-channel from the wireless radio node. In particular embodiments, MTC device 110 may receive additional configuration parameters with the received uplink sub-channel (such as those described in reference to step 2410).

At step 2416, in particular embodiments, the MTC device may tune its uplink transmitter to transmit using a frequency indicated by the second received uplink sub-channel information.

At step 2418, the MTC device transmits SRS to the wireless radio node. In particular embodiments, the MTC device may repeat steps 2410 to 2418 any number of times. In particular embodiments, the MTC device may receive an indication of multiple uplink sub-channels at step 2410. In such an embodiment, the MTC device may perform steps 2416 and 2418 for each of the multiple uplink sub-channels, skipping step 2414.

At step 2420, in particular embodiments, the MTC device may receive an indication of a preferred uplink sub-channel from the wireless radio node. For example, MTC device may receive an indication of a preferred uplink sub-channel from wireless radio node 120 similar to the indication transmitted by wireless radio node 120 described in step 2320 with reference to FIG. 23 above. In particular embodiments, MTC device 110 may tune its transmitter to the preferred uplink sub-channel and transmit SRS in the SRS sub-channel of the preferred uplink sub-channel. In particular embodiments, the preferred uplink sub-channel indication may also comprise and indication of a preferred hopping pattern.

Modifications, additions, or omissions may be made to method 2400. Additionally, one or more steps in method 2400 of FIG. 24 may be performed in parallel or in any suitable order.

Figures 25, 26:
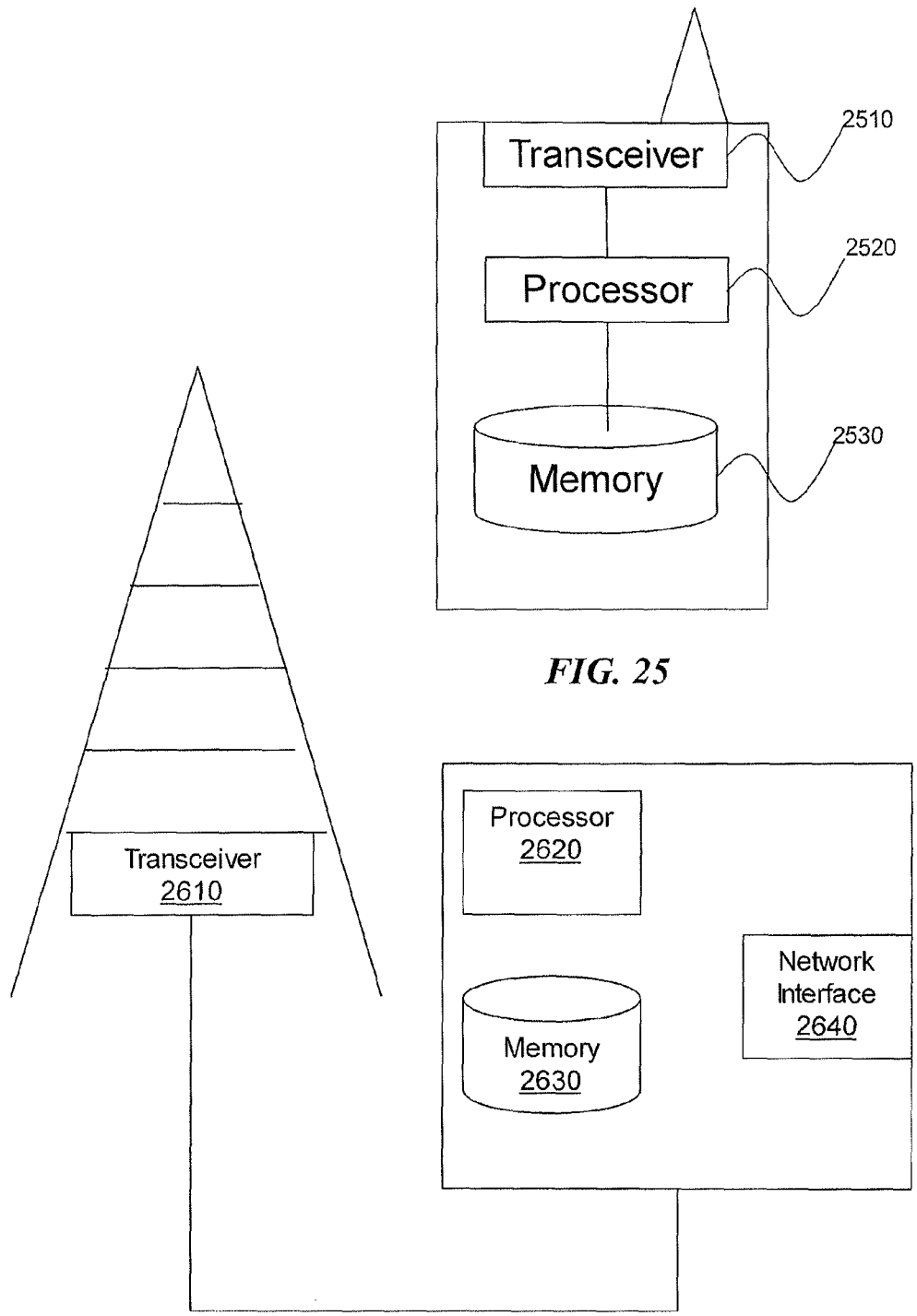
FIG. 25 is a block diagram illustrating an example embodiment of a wireless device.
FIG. 26 is a block diagram illustrating an example embodiment of a wireless radio node.

FIG. 25 is a block diagram illustrating an example embodiment of a wireless device. The wireless device includes MTC device 110 and wireless device 140 illustrated in FIG. 1. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 2510, processor 2520, and memory 2530. In some embodiments, transceiver 2510 facilitates transmitting wireless signals to and receiving wireless signals from wireless network node 120 (e.g., via an antenna), processor 2520 executes instructions to provide some or all of the functionality described herein as provided by the wireless device, and memory 2530 stores the instructions executed by processor 2520.

Processor 2520 includes any suitable combination of hardware and software implemented in one or more integrated circuits or modules to execute instructions and manipulate data to perform some or all of the described functions of the wireless device. Memory 2530 is generally operable to store computer executable code and data. Examples of memory 2530 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 2520 in communication with transceiver 2510 transmits SRS 135 to wireless radio node 120. Other embodiments of the wireless device may include additional components (beyond those shown in FIG. 25) responsible for providing certain aspects of the wireless device's functionality, including any of the functionality described above and/or any additional functionality (including any functionality necessary to support the solution described above).

FIG. 26 is a block diagram illustrating an example embodiment of a wireless radio node. Wireless radio node 120 can be an eNodeB, a node B, a base station, a wireless access point (e.g., a Wi-Fi access point), a low power node, a base transceiver station (BTS), a transmission point or node, a remote RF unit (RRU), a remote radio head (RRH), or other radio access node. Wireless radio node 120 includes at least one transceiver 2610, at least one processor 2620, at least one memory 2630, and at least one network interface 2640. Transceiver 2610 facilitates transmitting wireless signals to and receiving wireless signals from a wireless device, such as MTC device 110 or wireless device 140 (e.g., via an antenna); processor 2620 executes instructions to provide some or all of the functionality described above as being provided by a wireless radio node 120; memory 2630 stores the instructions executed by processor 2620; and network interface 2640 communicates signals to backend network components, such as a gateway, switch, router, Internet, Public Switched Telephone Network (PSTN), controller, and/or other wireless radio nodes 120. Processor 2620 and memory 2630 can be of the same types as described with respect to processor 2520 and memory 2530 of FIG. 25 above.

In some embodiments, network interface 2640 is communicatively coupled to processor 2620 and refers to any suitable device operable to receive input for wireless radio node 120, send output from wireless radio node 120, perform suitable processing of the input or output or both, communicate to other devices, or any combination of the preceding. Network interface 2640 includes appropriate hardware (e.g., port, modem, network interface card, etc.) and software, including protocol conversion and data processing capabilities, to communicate through a network.

In particular embodiments, processor 2620 selects an uplink sub-channel from a plurality of potential uplink sub-channels. In particular embodiments, processor 2620 in communication with transceiver 2610 transmits an indication of the selected uplink sub-channel to MTC device 110. In particular embodiments, processor 2620 in communication with transceiver 2610 receives SRS 135 from MTC device 110.

Other embodiments of wireless radio node 120 include additional components (beyond those shown in FIG. 26) responsible for providing certain aspects of the wireless radio node's functionality, including any of the functionality described above and/or any additional functionality (including any functionality necessary to support the solution described above). The various different types of wireless radio nodes may include components having the same physical hardware but configured (e.g., via programming) to support different radio access technologies, or may represent partly or entirely different physical components.

Some embodiments of the disclosure may provide one or more technical advantages. As an example, in some embodiments, the methods and apparatus disclosed herein may reduce size, cost, and power consumption of components compared to traditional techniques. For example, MTC device cost reduction may be achieved by reducing the amount of radio frequency bandwidth an MTC device uses to communicate with a wireless radio node. As another advantage, particular embodiments may facilitate operation of a narrow-band MTC device within the wider system bandwidth of a traditional LTE system.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP 3rd Generation Partnership Project
CFI Control Format Indicator
CQI Channel Quality Information
DCI Downlink Control Information
DFT Discrete Fourier Transform
eNB Enhanced Node-B
ePDCCH Enhance physical downlink control channel
E-SMLC Evolved Serving Mobile Location Center
E-UTRA Evolved Universal Terrestrial Radio Access
FDD Frequency Division Duplexing
HARQ Hybrid ARQ
LMU Location Measurement Unit
LTE Long term evolution
MTC Machine Type Communication
OFDM Orthogonal Frequency-Division Multiplexing
PDCCH Physical downlink control channel
PRB Physical Resource Block
PUCCH Physical Uplink Control Channel
PUSCH Physical Uplink Shared Channel
RB Resource Block
SC-FDMA Single-Carrier Frequency-Division Multiple Access
SINR Signal to Interference plus Noise Ratio
SRS Sounding Reference Signal
TDD Time Division Duplexing
UCI Uplink Control Information
UE User Equipment
UTDOA Uplink Time Difference-Of-Arrival

The invention claimed is:
1. A method of operating a wireless device in a wireless system said method comprising:
    allocating, by the at least one processor, a first uplink sub-channel to the wireless device in a first subframe associated with the wireless device, wherein the first uplink sub-channel comprises a portion of an uplink system bandwidth, and portions of the uplink system bandwidth outside of the first uplink sub-channel are not available for transmission in the first subframe by the wireless device;

determining, by the at least one processor, a first sounding reference signal (SRS) sub-channel, wherein the first SRS sub-channel comprises a portion of the first uplink sub-channel in frequency domain, and the SRS sub-channel is available for transmitting SRS in the first subframe by the wireless device; and configuring the wireless device to transmit in the first subframe on the SRS sub-channel.

2. The method of claim 1, wherein the allocating the first uplink sub-channel to the wireless device comprises selecting the first uplink sub-channel from a plurality of potential uplink sub-channels, wherein each of the plurality of uplink sub-channels is associated with one of a plurality of SRS sub-channels.

3. The method of claim 1, further comprising using a portion of the first uplink sub-channel for uplink control channel transmission, wherein the portion for uplink control channel transmission does not overlap with the first SRS sub-channel in the first subframe.

4. The method of claim 1, further comprising configuring frequency hopping of the first uplink sub-channel, wherein a second uplink sub-channel is allocated in a second subframe for the wireless device, the second uplink sub-channel comprising a portion of an uplink system bandwidth, and the second uplink sub-channel being different from the first uplink sub-channel in frequency domain.

5. The method of claim 1 wherein configuring the wireless device to transmit in the first subframe on the SRS sub-channel comprises configuring one or more symbols of the first subframe for SRS transmission of the wireless device.

6. The method of claim 5, wherein a last symbol of the first subframe is configured for SRS transmission of the wireless device.

7. The method of claim 1, further comprising:
receiving a first SRS transmission within the first uplink sub-channel from the wireless device;
receiving a second SRS transmission within a second uplink sub-channel from the wireless device;
determining, based on the first SRS transmission received from the wireless device and the second SRS transmission received from the wireless device, a preferred uplink sub-channel.

8. The method of claim 1, further comprising:
allocating a second uplink sub-channel associated with the wireless device;
transmitting an indication of the allocated second uplink sub-channel to the wireless device; and
transmitting a frequency hopping signal to the wireless device, the frequency hopping signal indicating a frequency position of where to transmit SRS on the first uplink sub-channel and a frequency position of where to transmit SRS on the second uplink sub-channel.

9. The method of claim 1, further comprising:
determining a frequency hopping signal specifying a pattern of SRS frequency positions for transmitting SRS over time;
transmitting the frequency hopping signal to the wireless device; and
receiving a SRS transmission from the wireless device when a frequency position of the SRS sub-channel included in the first uplink sub-channel corresponds to a SRS frequency position specified by the frequency hopping signal.

10. The method of claim 1, further comprising multiplexing SRS transmission of the wireless device with SRS transmission of another wireless device in the first subframe.

11. The method of claim 1, further comprising sending a signal to the wireless device to trigger SRS transmission over the first SRS sub-channel in the first subframe.

12. A wireless radio node for assigning uplink bandwidth of a wireless system to a wireless device, the wireless radio node comprising:
a memory storing instructions; and
a processor configured to execute the instructions to cause the processor to:
allocate a first uplink sub-channel to the wireless device in a first subframe associated with the wireless device, wherein the first uplink sub-channel comprises a portion of an uplink system bandwidth, and portions of the uplink system bandwidth outside of the first uplink sub-channel are not available for transmission in the first subframe by the wireless device;
determine a first sounding reference signal (SRS) sub-channel, wherein the first SRS sub-channel comprises a portion of the first uplink sub-channel in frequency domain, and the SRS sub-channel is available for transmitting SRS in the first subframe by the wireless device; and
configure the wireless device to transmit in the first subframe on the SRS sub-channel.

13. The wireless radio node of claim 12, wherein allocating the first uplink sub-channel to the wireless device comprises selecting the first uplink sub-channel from a plurality of potential uplink sub-channels, wherein each of the plurality of uplink sub-channels is associated with one of a plurality of SRS sub-channels.

14. The wireless radio node of claim 12, wherein the processor is further configured to execute the instructions to cause the processor to use a portion of the first uplink sub-channel for uplink control channel transmission, wherein the portion for uplink control channel transmission does not overlap with the first SRS sub-channel in the first subframe.

15. The wireless radio node of claim 12, wherein the processor is further configured to execute the instructions to cause the processor to configure frequency hopping of the first uplink sub-channel, wherein a second uplink sub-channel is allocated in a second subframe for the wireless device, the second uplink sub-channel comprising a portion of an uplink system bandwidth, and the second uplink sub-channel being different from the first uplink sub-channel in frequency domain.

16. The wireless radio node of claim 12, wherein configuring the wireless device to transmit in the first subframe on the SRS sub-channel comprises configuring one or more symbols of the first subframe for SRS transmission of the wireless device.

17. The wireless radio node of claim 16, wherein a last symbol of the first subframe is configured for SRS transmission of the wireless device.

18. The wireless radio node of claim 12, wherein the processor is further configured to execute the instructions to cause the processor to:
receive a first SRS transmission within the first uplink sub-channel from the wireless device;
receive a second SRS transmission within a second uplink sub-channel from the wireless device;

determine, based on the first SRS transmission received from the wireless device and the second SRS transmission received from the wireless device, a preferred uplink sub-channel.

19. The wireless radio node of claim 12, wherein the processor is further configured to execute the instructions to cause the processor to:
allocate a second uplink sub-channel associated with the wireless device;
transmit an indication of the allocated second uplink sub-channel to the wireless device; and
transmit a frequency hopping signal to the wireless device, the frequency hopping signal indicating a frequency position of where to transmit SRS on the first uplink sub-channel and a frequency position of where to transmit SRS on the second uplink sub-channel.

20. The wireless radio node of claim 12, wherein the processor is further configured to execute the instructions to cause the processor to:
determine a frequency hopping signal specifying a pattern of SRS frequency positions for transmitting SRS over time;
transmit the frequency hopping signal to the wireless device; and
receive a SRS transmission from the wireless device when a frequency position of the SRS sub-channel included in the first uplink sub-channel corresponds to a SRS frequency position specified by the frequency hopping signal.

21. The wireless radio node of claim 12, wherein the processor is further configured to execute the instructions to cause the processor to multiplex SRS transmission of the wireless device with SRS transmission of another wireless device in the first subframe.

22. The wireless radio node of claim 12, wherein the processor is further configured to execute the instructions to cause the processor to send a signal to the wireless device to trigger SRS transmission over the first SRS sub-channel in the first subframe.

* * * * *